(12) United States Patent
Morgenstern et al.

(10) Patent No.: US 8,967,089 B2
(45) Date of Patent: Mar. 3, 2015

(54) REFORMED ETHANOL ENGINES

(75) Inventors: David A. Morgenstern, Creve Coeur, MO (US); Jennifer C. Wheeler, Milford, MI (US); Robert A. Stein, Saline, MI (US)

(73) Assignee: Monsanto Technology LLC, St. Louis, MO (US)

( * ) Notice: Subject to any disclaimer, the term of this patent is extended or adjusted under 35 U.S.C. 154(b) by 354 days.

(21) Appl. No.: 13/381,243

(22) PCT Filed: Jun. 28, 2010

(86) PCT No.: PCT/US2010/040228
§ 371 (c)(1),
(2), (4) Date: Dec. 28, 2011

(87) PCT Pub. No.: WO2011/002722
PCT Pub. Date: Jan. 6, 2011

(65) Prior Publication Data
US 2012/0097117 A1    Apr. 26, 2012

Related U.S. Application Data

(60) Provisional application No. 61/221,432, filed on Jun. 29, 2009.

(51) Int. Cl.
| | | |
|---|---|---|
| F02M 27/02 | (2006.01) |
| F01N 5/02 | (2006.01) |
| C01B 3/22 | (2006.01) |
| C01B 3/32 | (2006.01) |
| C01B 3/48 | (2006.01) |
| C10L 1/02 | (2006.01) |
| F02M 25/07 | (2006.01) |
| F02M 25/12 | (2006.01) |
| F02D 19/06 | (2006.01) |
| F02D 19/08 | (2006.01) |

(52) U.S. Cl.
CPC ... F01N 5/02 (2013.01); C01B 3/22 (2013.01); C01B 3/326 (2013.01); C01B 3/48 (2013.01); C01B 2203/0227 (2013.01); C01B 2203/0283 (2013.01); C01B 2203/0811 (2013.01); C01B 2203/0822 (2013.01); C01B 2203/0827 (2013.01); C01B 2203/1076 (2013.01); C01B 2203/84 (2013.01); C10L 1/023 (2013.01); F02M 25/0752 (2013.01); F02M 25/12 (2013.01); F02M 27/02 (2013.01); Y02T 10/121 (2013.01); Y02T 10/36 (2013.01); Y02T 10/16 (2013.01); F02D 19/0644 (2013.01); F02D 19/0655 (2013.01); F02D 19/0671 (2013.01); F02D 19/081 (2013.01)
USPC .............................................. 123/3; 123/1 A

(58) Field of Classification Search
CPC ............ F02D 19/0671; F02D 41/0047; F02D 19/0655; F02B 47/08; F01N 3/0842; F01N 5/02; F02M 25/0752; F02M 27/02; F02M 25/0718; F02M 25/0723
USPC ............................................................ 123/3
See application file for complete search history.

(56) References Cited

U.S. PATENT DOCUMENTS

| | | | | |
|---|---|---|---|---|
| 5,520,161 | A * | 5/1996 | Klopp ........................... | 123/676 |
| 6,155,212 | A | 12/2000 | McAlister | |
| 6,405,720 | B1 | 6/2002 | Collier, Jr. | |
| 7,770,545 | B2 * | 8/2010 | Morgenstern ...................... | 123/3 |
| 2002/0112471 | A1 * | 8/2002 | Shroder et al. .................. | 60/295 |
| 2004/0137288 | A1 * | 7/2004 | Morgenstern ................... | 429/17 |
| 2004/0254062 | A1 * | 12/2004 | Crocker et al. ................. | 502/71 |
| 2007/0056266 | A1 * | 3/2007 | Kurtz ............................... | 60/279 |
| 2007/0272202 | A1 * | 11/2007 | Kuo et al. ..................... | 123/295 |
| 2009/0272362 | A1 * | 11/2009 | Yun et al. ..................... | 123/295 |

FOREIGN PATENT DOCUMENTS

| | | |
|---|---|---|
| EP | 1835152 A1 | 9/2007 |
| GB | 1525600 | 12/2011 |
| WO | 0107774 A1 | 2/2001 |
| WO | 0175294 A1 | 10/2001 |
| WO | 03012269 A2 | 2/2003 |
| WO | 2007147008 A2 | 12/2007 |
| WO | 2008090162 A1 | 7/2008 |
| WO | 2009064712 A1 | 5/2009 |

OTHER PUBLICATIONS

PCT/US2010/040228 International Search Report, European Patent Office, Sep. 30, 2010, 3 pages, Europe.

* cited by examiner

Primary Examiner — Marguerite McMahon
Assistant Examiner — Tea Holbrook
(74) Attorney, Agent, or Firm — Senniger Powers LLP; James E. Davis

(57) ABSTRACT

Improved internal combustion engine power systems (e.g., those used to generate mechanical or electrical power in vehicular applications) that utilize a reformed alcohol fuel comprising a hydrogen-containing gas mixture, and more particularly, the efficient operation of such engines and power systems are disclosed. Modes of operating the engine power systems that provide faster startup and lower cost and emissions are provided. In various preferred embodiments, the internal combustion engine power systems include dilution of the intake fluid mixture introduced into the combustion chamber or cylinder of the engine using recirculated exhaust gas and/or excess combustion air as the diluent, use of blends of ethanol reformate and unreformed ethanol as fuel and aftertreatment of the exhaust gas discharged from the cylinder using a lean $NO_x$ trap.

14 Claims, 10 Drawing Sheets

US 8,967,089 B2

REFORMED ETHANOL ENGINES

FIELD OF THE INVENTION

The present invention is generally related to internal combustion engine power systems (e.g., those used to generate mechanical or electrical power in vehicular applications) that utilize a reformed alcohol fuel comprising a hydrogen-containing gas mixture, and more particularly, to the efficient operation of such engines and power systems.

BACKGROUND OF THE INVENTION

In U.S. Publication No. US 2004/0137288 A1 and "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005), Morgenstern et al. disclose a process for gas phase reforming and conversion of ethanol to methane, hydrogen and $CO/CO_2$ at low temperatures (e.g., below about 300° C.) using a reforming catalyst comprising copper-plated Raney alloys.

U.S. Publication No. US 2008/0010993 A1 by Morgenstern, discloses processes for reforming ethanol to produce a hydrogen and methane-containing reformate gas mixture that can be combusted in an internal combustion engine to provide mechanical or electrical power, and the exhaust from the engine utilized to provide heat to the reforming reaction.

The entire contents of these publications by Morgenstern et al. are incorporated herein by reference.

SUMMARY OF THE INVENTION

One embodiment of the present invention is directed to a process for producing mechanical or electrical power from a fuel comprising ethanol. The process comprises contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof. A combustible gas mixture is combusted in a combustion chamber of an internal combustion engine to produce an exhaust gas mixture. The combustible gas mixture comprises air, hydrogen and methane obtained in the product reformate gas mixture and an exhaust gas effluent comprising from about 5% to about 40% of the exhaust gas mixture produced in previous combustion. The energy of combustion is utilized for the generation of mechanical or electrical power, at least a portion of the exhaust gas mixture is discharged from the combustion chamber and at least a portion of the discharged exhaust gas mixture is brought into thermal contact with the reforming reaction zone to thereby heat the reforming catalyst therein and cool the discharged exhaust gas mixture.

In accordance with another embodiment of the present invention, the process for producing mechanical or electrical power from a fuel comprising ethanol comprises contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof. The molar ratio of methane to the carbon oxide component in the product reformate gas mixture is from about 0.9 to about 1.25 and the rate at which methane is produced in the reformate gas mixture is at least about 50% of the rate of ethanol introduced into the reforming reaction zone on a molar basis. A combustible gas mixture comprising air and hydrogen and methane obtained in the product reformate gas mixture is combusted in a combustion chamber of an internal combustion engine with from about 5% to about 40% exhaust gas recirculation to produce an exhaust gas mixture. The energy of combustion is utilized for the generation of mechanical or electrical power and at least a portion of discharged exhaust gas mixture is brought into thermal contact with the reforming reaction zone to thereby heat the reforming catalyst therein and cool the discharged exhaust gas mixture.

In a further embodiment of the present invention, the process for producing mechanical or electrical power from a fuel comprising ethanol comprises contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof. An intake fluid mixture is introduced into a combustion chamber of an internal combustion engine. The intake fluid mixture comprises air and hydrogen and methane obtained in the product reformate gas mixture with lambda ($\lambda$) of the intake fluid mixture being greater than 1. The intake fluid mixture is combusted in the combustion chamber to produce an exhaust gas mixture comprising nitrogen oxides and the energy of combustion is utilized for the generation of mechanical or electrical power. At least a portion of the exhaust gas mixture is discharged from the combustion chamber and brought into thermal contact with the reforming reaction zone to thereby heat the reforming catalyst therein and cool the discharged exhaust gas mixture. At least a portion of the discharged exhaust gas mixture is passed through a nitrogen oxides trap.

In a still further embodiment of the present invention, the process for producing mechanical or electrical power from a fuel comprising ethanol comprises contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof. An intake fluid mixture comprising air and a fuel selected from the group consisting of hydrogen and methane obtained in the product reformate gas mixture, unreformed ethanol and mixtures thereof is introduced into a combustion chamber of an internal combustion engine. The intake fluid mixture is combusted in the combustion chamber to produce an exhaust gas mixture and the energy of combustion is utilized for the generation of mechanical or electrical power. At least a portion of the exhaust gas mixture is discharged from the combustion chamber and brought into thermal contact with the reforming reaction zone to thereby heat the reforming catalyst therein and cool the discharged exhaust gas mixture. When the internal combustion engine is operated below about 7 bar IMEP, the intake fluid mixture is diluted by at least about 20% and the fuel in the intake fluid mixture comprises a mixture of reformed ethanol and unreformed ethanol in a mass ratio of from about 1:3 to about 3:1.

Other objects and features will be in part apparent and in part pointed out hereinafter.

DESCRIPTION OF THE PREFERRED EMBODIMENTS

Figure 1:
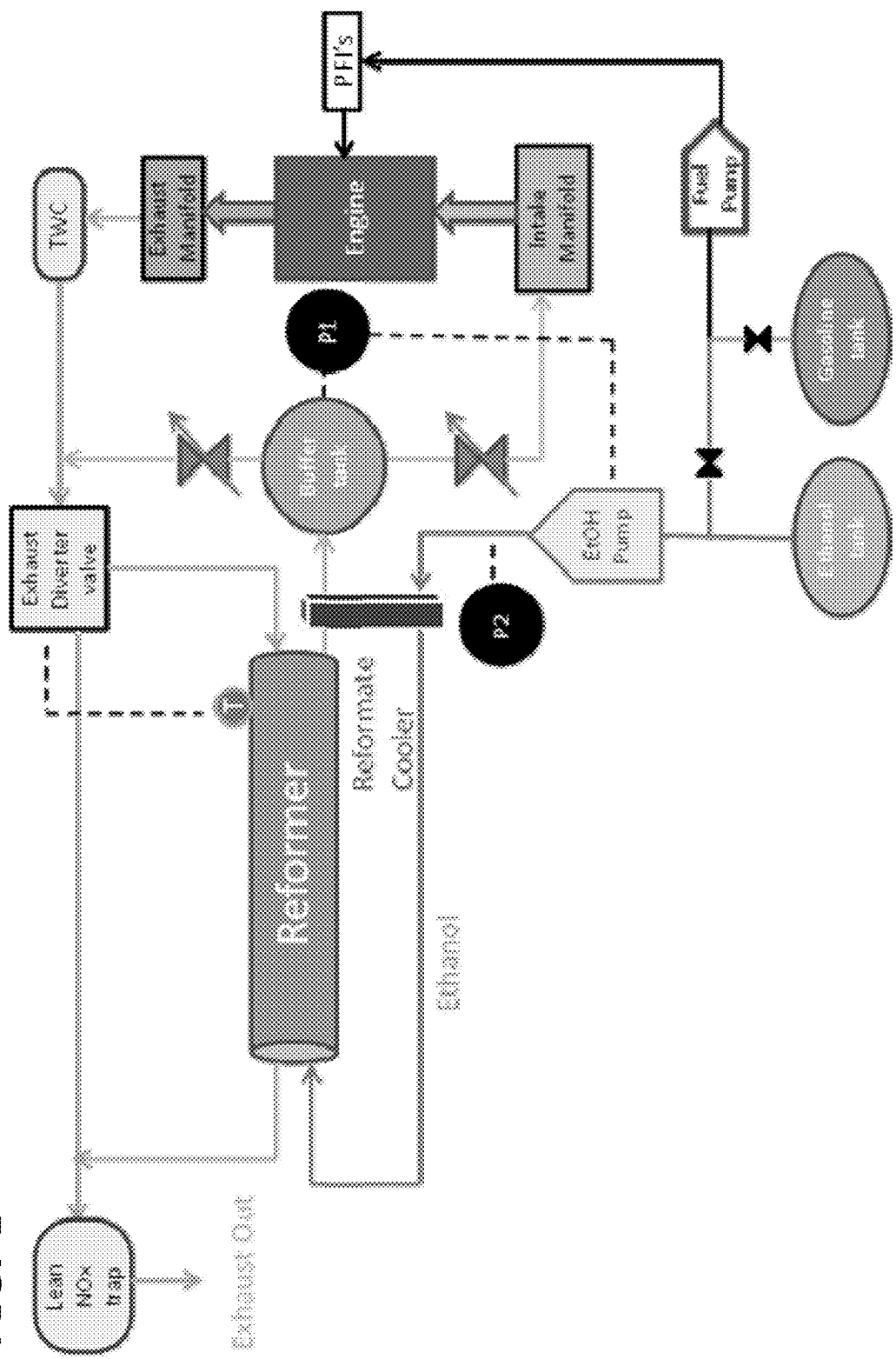
FIG. 1 is a schematic drawing of a reformed ethanol flex-fuel power system incorporating an alcohol reformer, reformate cooler, buffer tank and lean NOx trap.

Embodiments of the present invention are directed to internal combustion engine (ICE) power systems utilizing a reformed alcohol (e.g., ethanol) fuel or reformate and the provision of such systems exhibiting improved efficiency and low emissions. Modes of operating the ICE power system that provide faster startup and lower cost are also provided.

One aspect of the present invention is to provide levels of dilution (e.g., at least about 20%) in the combustion chamber or cylinder of the ICE using exhaust gas (exhaust gas recirculation or EGR) and/or excess air which simultaneously enables high efficiencies and low emission levels to be attained, while keeping exhaust gas temperatures high enough to maintain high conversion in the reforming reaction zone of the alcohol reformer. When exhaust is used as the diluent, EGR levels of from about 5% to about 40% are preferred (i.e., it is preferred that from about 5% to about 40% of the exhaust is recycled), more preferably, from about 15% to about 40%, more preferably at least about 20%, and even more preferably from about 30% to about 40%, as higher levels may produce undesirable variation in combustion from cycle to cycle. When excess air is used, the ratio of air in the intake fluid mixture to that required stoichiometrically (commonly known as lambda (λ)) is preferably selected so as to maintain an exhaust gas temperature hot enough to provide sufficient heat to the reforming reaction zone and maintain the activity of the reforming catalyst. Lambda (λ) is calculated by dividing the actual air:fuel ratio by the stoichiometric ratio of air:fuel for the fuel being combusted. When excess air is used as the diluent, levels of dilution of at least about 20% are preferred (corresponding to a lambda (λ) value of about 1.2. In some embodiments, lambda (λ) values of 1.8 to 2.2 are especially preferred as these typically produce exhaust temperatures of about 400° C. Exhaust gas recirculation and excess air can be used in conjunction to achieve the desired level of dilution in the intake fluid mixture introduced into the combustion chamber of the internal combustion engine.

In one embodiment of the excess air strategy (i.e., wherein lambda (λ) of the intake fluid mixture is greater than 1), a "lean $NO_x$ trap" is present in the exhaust gas train in order to reduce concentrations of nitrogen oxides (e.g., NO, $NO_2$; collectively known as $NO_x$) in the exhaust gas to low levels. The trap can be efficiently regenerated by, for example, using the ethanol reformate or alternatively by intermittent operation of the engine rich of stoichiometric (i.e., by reducing lambda (λ) of the intake fluid mixture to less than 1 as necessary). Experience to date suggests that the latter strategy, intermittent rich engine operation, may be preferred because the methane in ethanol reformate reacts to only a small extent when regenerating the lean NOx trap.

In a further embodiment of the invention directed to reducing startup emissions, the engine can be started cold using reformate stored on board the vehicle with retarded spark timing in order to quickly increase exhaust gas temperatures to the "light-off" temperature at which point the catalytic converter becomes functional. Catalyst lightoff may be further accelerated by supplying a stream of reformate fuel to the catalytic converter when the exhaust temperature has reached about 100° C.

A further aspect of the invention is related to the benefit of reforming only a portion of the ethanol used to fuel the engine (i.e., the intake fluid mixture introduced into the combustion chamber comprises air and a fuel mixture comprising hydrogen and methane obtained in the product reformate gas mixture and unreformed ethanol. Reforming a portion of the ethanol and introducing the balance of the fuel as liquid ethanol, preferably via port fuel injectors, has been found to improve efficiency at most operating points. Furthermore, reforming only a fraction of the fuel enables the size and cost of the alcohol reformer to be reduced. Generally, reforming of from about 25% to about 75% of the ethanol fuel (by mass) is preferred (i.e., the fuel in the intake fluid mixture comprises a mixture of reformed ethanol and unreformed ethanol in a mass ratio of from about 1:3 to about 3:1) with a greater proportion of fuel reformed being favored at lower power and higher speed.

The above-mentioned publications of Morgenstern et al. describe a process by which ethanol can be reformed to produce a mixture of gases (i.e., reformate) at low temperatures (e.g., 300° C.) in accordance with equations (1) and (2). The gaseous products have a fuel value (or lower heating value) that is about 7% higher than that of liquid ethanol.

without water-gas shift:

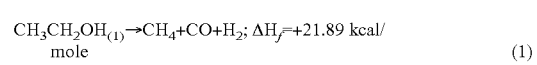

(1)

net after optional water-gas shift:

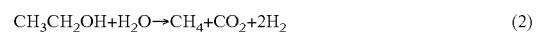

(2)

In embodiments where the feed gas mixture introduced into the reforming reaction zone of the reformer comprises ethanol, it is preferred that the reforming process proceed according to the low-temperature reaction pathway shown in reaction equations (1) and (2) (after optional water-gas shift if water is present in the ethanol feed). That is, by maintaining the reforming temperature within the preferred range (e.g., below about 400° C., more preferably below 350° C.), high-temperature decomposition of ethanol, which is dominant in high-temperature steam-reforming systems, does not appreciably occur. Thus, it is preferred that the product reformate gas mixture produced comprise hydrogen, methane and a carbon oxide component selected from the group consisting of carbon monoxide, carbon dioxide and mixtures thereof. Preferably, the methane and carbon oxide components are present in approximately equimolar amounts in the product reformate gas mixture. Molar ratios of methane to the carbon oxide component of from about 0.9 to about 1.25 are approximately equimolar. Moreover, undesired methanation is preferably minimized. An important advantage of the preferred reforming catalyst comprising a copper-containing active phase at the surface of a nickel sponge supporting structure is that methanation is negligible under the preferred operating conditions of the reformer at reforming temperatures of up to about 400° C., more preferably, temperatures of up to about 350° C.

When the alcohol fuel in the feed gas mixture introduced into the reforming reaction zone comprises ethanol, it is also preferred that the rate of methane production in the product reformate gas mixture be at least about 50% of the ethanol feed rate on a molar basis (i.e., at least about 50% conversion of ethanol to methane is achieved). More preferably, at least about 60% conversion of ethanol to methane is achieved, even more preferably at least about 70% conversion, at least about 80% conversion, at least about 90% conversion, and still more preferably at least about 95% of ethanol in the feed gas mixture is converted to methane in the reformate gas on a molar basis. The product reformate gas mixture preferably comprises not more than about 10 mole % acetaldehyde and not more than about 20 mole % ethanol, more preferably, not more than about 5 mole % acetaldehyde and not more than about 15 mole % ethanol. For catalysts containing a copper-containing active phase at the surface of a metal supporting structure, kinetics are described by Morgenstern et al. in "Low Temperature Reforming of Ethanol over Copper-Plated Raney Nickel: A New Route to Sustainable Hydrogen for Transportation," *Energy and Fuels*, Vol. 19, No. 4, pp. 1708-1716 (2005) as being a function of ethanol feed rate, catalyst loading, and temperature such that reformer conditions can be readily determined and selected based on power system requirements to produce a product reformate gas mixture of the desired composition.

In addition to the increased fuel value, reforming ethanol benefits engine efficiency because the presence of hydrogen in the product reformate gas mixture greatly increases flame speed, enabling combustion to occur at an acceptable rate even when the intake fluid mixture introduced to the cylinder is diluted with excess air or exhaust gas. The use of dilute intake mixtures to achieve efficiency improvements is well-known in the engine field. Diluents reduce temperatures in the cylinder which in turn reduces heat losses to the coolant through the cylinder walls. Furthermore, at part load, diluents reduce throttling losses. The use of excess air provides further improvements in efficiency by reducing the ratio of specific heats, or gamma ($\gamma$), of the mixture in the cylinder.

The use of excess air or cooled external exhaust gas recirculation (EGR) reduces exhaust gas temperatures, which may have a detrimental effect on the performance of the reformer if the exhaust gas being used to heat the reformer is not able to heat the catalyst to its operating temperature (e.g., at least about 300° C. at the exit of the reformer). The use of internal EGR, on the other hand, may produce exhaust gas having a higher temperature than exhaust gas produced using excess air or cooled external EGR because the internal EGR has a higher temperature than the cooled external EGR when it returns to the cylinder. More specifically, increasing exhaust gas temperatures, such as by using internal EGR, may be valuable because the alcohol reformer functions as a heat exchanger between the exhaust gas stream (which provides heat) and the catalyst and incoming ethanol fuel that receive it. The rate of heat transfer per unit area at a given point is proportional to the temperature difference between the hot and cold sides. In differential form, this relationship is expressed by equation (3), which is taken from *Handbook of Heat Transfer*, (Rohsenow, Warren M., Hartnett, James P., and Cho, Young I. eds, McGraw Hill New York, 1998 pg 17.28), where dq is the heat transfer rate from the hot to cold fluid across the surface area dA and $(T_h-T_c)_{loc}$ is the temperature difference at that point.

$$q=(T_h-T_c)_{loc}dA \qquad (3)$$

In this case, $T_h-T_c$ corresponds to the difference between the temperature of the exhaust stream and the temperature of the catalyst. The temperature of the catalyst is typically about 300° C. at the exit of the reformer. Thus, by maintaining a hotter exhaust gas temperature, it is possible to utilize an alcohol reformer having a smaller heat exchange surface area, thus reducing cost and weight for the reformer. Moreover, a smaller reformer will have a lower thermal mass and can therefore be brought to temperature more quickly by exhaust heat. It is preferable to maintain an exhaust gas temperature of at least about 400° C. throughout most of the drivecycle and more preferably at least about 450° C. during portions of the drivecycle that require higher rates of fuel flow through the reformer and thus greater rates of heat transfer (e.g., those at low power and higher speeds).

For this reason, the use of exhaust gas recirculation (EGR) is preferred over the use of excess air at higher engine loads. Since the overall fuel flow is higher, under these conditions it is preferred to take measures to ensure reformer activity is maintained. Use of EGR maintains high exhaust gas temperature and the proportion of the fuel flow to the reformer is reduced. Furthermore, it is preferable that some or all of the EGR be "internal EGR" rather than cooled external EGR. Recirculation of exhaust gas through a cooler and back to the intake manifold is a common approach to improving emissions in engines, but it has the effect of reducing exhaust gas temperatures. In addition, it is challenging to achieve such high EGR rates (i.e., preferably from about 30% to about 40%) in production vehicles. Furthermore, the higher temperatures of exhaust gases recirculated internally reduce throttling losses. Internal EGR may be accomplished by leaving the exhaust valve open during a portion of the subsequent intake stroke, which results in a portion of the discharged exhaust gas mixture being drawn back into the combustion chamber or cylinder or by otherwise retaining a portion of the exhaust gas mixture in the combustion chamber. Very little exhaust cooling occurs during this process, which results in higher exhaust temperatures than would be achieved by equivalent dilution with air or cooled exhaust. Delayed opening of the exhaust valve also increases expansion work by delaying exhaust blowdown. Internal EGR has the further advantages of being rapidly adjustable on engines with valves controlled with variable timing either by variable cam timing or electronic controls. Such engines are preferred for operation with reformed ethanol fuel.

As noted above, it has been found that reforming only a portion of the ethanol provides improved efficiency at most operating points compared to operation with 100% reformate or using only unreformed liquid ethanol fuel (0% reformate). Reforming the preferred fraction of the ethanol is beneficial not only in improving engine efficiency, but also by reducing thermal demands on the reformer, since it is not necessary to vaporize and reform as much ethanol. Preferred splits between reformed and liquid ethanol are described below.

A further constraint on the use of excess air or EGR stems from the fact that excessive dilution of the intake fluid mixture introduced into the cylinder of the engine causes combustion to become unstable. The stability of combustion is typically measured as the coefficient of variation (COV) of indicated mean effective pressure (IMEP). COVs above about 2% are generally deemed unacceptable for passenger vehicle operation except at idle. This limits the air-fuel ratio in excess of stoichiometric or EGR level used.

In view of these various considerations, when exhaust gas is used as the diluent, EGR levels of from about 30% to about 40% are especially preferred in some embodiments of the present invention, as higher levels tend to produce undesirable variation in combustion from cycle to cycle. As shown in the Examples, exhaust gas temperatures are maintained at approximately 450° C., even when using cooled external EGR at these levels. Dilution with excess air, rather than EGR, enables greater efficiency improvements at low load. As noted above, lambda ($\lambda$) values of from about 1.8 to about 2.2 are preferred in some embodiments of the present invention as these produce exhaust gas temperatures of about 400° C. with COV below about 2%. Higher $\lambda$ values increase COV and reduce exhaust gas temperatures outside the preferred range. An optimum $\lambda$ value of about two was described by Wong et al.

A still further consideration involves managing emission levels from the engine so as to achieve or surpass legal standards. For spark ignition engines, the three primary pollutants are nitrogen oxides ($NO_x$), carbon monoxide (CO), and hydrocarbons. Particularly in the U.S., hydrocarbon standards are defined in terms of non-methane hydrocarbons. Ethanol reformate is therefore an advantageous fuel with respect to satisfying existing hydrocarbon emission requirements because methane is the only hydrocarbon in the fuel. Some hydrocarbon emissions from unreformed liquid ethanol and motor oil are expected, however.

Methane emissions from vehicles may be regulated in the future, since methane is a potent greenhouse gas. However, it has been found that engine-out methane emissions from engines fueled by a 50-50 mixture of ethanol reformate and E85 are equivalent to those from gasoline on the same engine at the same operating point. Tailpipe emissions are lower when operating with excess air (lambda greater than one) since the presence of oxygen in the exhaust improves the hydrocarbon oxidation efficiency of the catalytic converter.

Owing to rapid flame propagation when using ethanol reformate, it has been found that CO and hydrocarbons, both products of incomplete combustion, are suppressed compared to unreformed liquid ethanol and gasoline fuels. Furthermore, CO and hydrocarbon emissions can be efficiently managed by conventional three-way exhaust catalysts even at high lambda ($\lambda$), so long as the exhaust gas temperature remains hot enough to maintain three-way catalyst activity. This typically requires an exhaust gas temperature of at least about 400° C. But three-way catalysts are ineffective in reducing $NO_x$ in the presence of excess air (i.e., lambda ($\lambda$) value greater than 1).

As shown in the Examples, dilution with EGR or excess air is effective in greatly reducing $NO_x$ emissions. When operating using EGR without excess air, further reduction of $NO_x$ levels by a conventional three-way catalyst enables very low $NO_x$ levels to be achieved when the three-way catalyst is at an adequate operating temperature. Engine-out $NO_x$ levels are low when operating with excess air in the preferred range (e.g., lambda ($\lambda$) value about two), but they are not negligible.

There are three preferred operating strategies when using ethanol reformate that achieve acceptable $NO_x$ levels.

1. Operation with EGR and no excess air (lambda ($\lambda$) value no greater than 1) throughout the drivecycle.

2. Operation with lambda ($\lambda$) about two for a small portion of the drivecycle (preferably at low power) and operation with EGR throughout the balance of the drivecycle.

3. Operation with lambda ($\lambda$) greater than one for a significant portion of the drivecycle in conjunction with an advanced aftertreatment system for $NO_x$ abatement, preferably selective catalytic reduction (SCR) or the use of a lean $NO_x$ trap.

Strategy 3 is particularly preferred when combined with the use of internal EGR. As further described in the Examples, the lambda and EGR levels for each operating point can be chosen so as to satisfy the criteria discussed above: adequate exhaust gas temperature, acceptable COV of BMEP, low NOx, and high efficiency. In addition, many engines impose an additional operational constraint due to the fact that some level of vacuum must be maintained in the intake manifold in order to operate the PCV and other systems. The limit on the Manifold Absolute Pressure (the "MAP limit") is engine-specific. For the multi-cylinder engine described in the Examples, the MAP limit was 90 kPa absolute pressure.

The precise values of these limits will depend on the vehicle and the performance of the reformer. For example, a more efficient reformer can tolerate lower exhaust temperatures and heavier vehicles will need stricter limits on NOx. Higher NOx is also expected at higher-power operating points due to increased cylinder temperatures. Typical targets are 425° C. exhaust temperature, 2% COV of combustion, and 2-4 g of brake-specific NOx per kilowatt hour Lean $NO_x$ traps are well known in the art as a method for reducing $NO_x$ emissions from engines running lean (i.e., lambda ($\lambda$) greater than one). As described by W. S. Epling et al. in *Catal. Rev.*, vol. 46 (2004), pp 163-245, during lean operation, NO in the exhaust stream is oxidized, typically by platinum, to $NO_2$. The $NO_2$ is then further oxidized and absorbed as a nitrate. During regeneration under reducing conditions, the nitrates are reduced to $N_2$. Lean $NO_x$ traps are prone to deactivate due to poisoning from sulfur oxides derived from sulfur in gasoline, but ethanol (and ethanol reformate) is low in sulfur. Sulfur poisoning of lean $NO_x$ traps is described by Matsumoto et al. (*Appl. Cat. B.*, vol. 25 (2000), 115-24).

In accordance with the present invention, a lean $NO_x$ trap is preferably positioned downstream from the alcohol reformer. NO oxidation is preferred at from about 300 to about 400° C., thus the cooling of exhaust gas that occurs in the reformer will improve $NO_x$ trap performance.

$NO_x$ levels during operation with lambda ($\lambda$) values of about two or for lambda values between 1.2 and 2 combined with internal or external EGR are far lower than is typical using liquid fuels, greatly reducing the frequency of lean $NO_x$ trap regeneration and thereby improving fuel economy.

Emissions at engine startup, when the three-way catalyst is cold and inactive, are a key contributor to total vehicle emissions through the drivecycle. This is particularly true for unreformed ethanol vehicles, since ethanol's heat of vaporization is higher than gasoline's (840 kJ/kg, versus about 350 kJ/kg for gasoline), leading to incomplete combustion and high levels of hydrocarbon and CO emissions during cold start. As a result, engines operating on ethanol-rich fuels such as E85 have difficulty meeting strict emissions standards such as SULEV. This issue is described in more detail in SAE paper 2009-01-1080, "Treatment of Vehicle Emissions from the Combustion of E85 and Gasoline with Catalyzed Hydrocarbon Traps," by J. A. Lupescu et al.

In U.S. Publication No. US 2008/0010993 A1 by Morgenstern, the use of stored ethanol reformate for cold starting an engine is described. The reformate tank also serves to buffer transients in reformate demand as the load on the engine varies. A further aspect of the present invention is the determination of a preferred quantity of reformate to be stored and an improved strategy for utilizing reformate at startup in order to achieve low tailpipe emissions.

As further described in Example 8, startup of a 0.575 liter displacement single-cylinder engine was performed at ambient temperature (25° C.) using a 1:1:1 mixture of hydrogen, methane, and carbon monoxide that simulates stored ethanol reformate. At 1000 rpm, 1.0 bar Net Indicated Mean Effective Pressure (NIMEP), the engine started far more smoothly using reformate compared to unreformed liquid ethanol with much lower hydrocarbon emissions. When starting on ethanol reformate, it was found that retarding the spark by about 20 degrees enabled the exhaust gas temperatures to exceed about 300° C. in 13 seconds and about 400° C. in 21 seconds. Retarding the spark also further reduced hydrocarbon and CO emissions by increasing temperatures during the expansion stroke which promotes oxidation. Moreover, the crevice volumes are loaded with unburned mixture at lower pressures, further reducing Indicated Specific Hydrocarbon (ISHC) emissions.

The working temperature (or "light-off temperature") for conventional three-way catalysts is about 300° C. and above (see M. Shelef and R. W. McCabe, Catal. Today, vol. 62, (2000) 35-50). A fuel flow of about 0.52 kg/hr was required during cold start on reformate with spark timing retarded by about 20 degrees. 13 seconds of reformate (enough to raise the exhaust temperature above 400° C.) therefore represents 1.9 g of fuel or 2.7 standard liters.

The amount of reformate that would need to be stored in vehicular engines depends on three factors: the displacement of the engine; the initial reformate pressure; and the minimum reformate storage pressure required in order to meter fuel to the engine. For example, if an engine has a displacement of 2.0 liters, then the amount of reformate that would have to be delivered can be calculated by scaling the results from the single-cylinder study in accordance with equation (4):

$$1.9 \text{ g reformate} \times (2.0 \text{ L}/0.575 \text{ L}) = 6.5 \text{ g reformate required for startup} \quad (4)$$

If the initial storage pressure and minimum delivery pressure are 7 atm. (absolute) and 4 atm. (absolute), respectively, then the total capacity of the reformate storage or buffer tank can be calculated in accordance with equation (5):

$$6.5 \text{ g reformate} \times (7 \text{ atm.})/(4 \text{ atm.}) = 11.4 \text{ g reformate} \quad (16.7 \text{ std. liters}) \quad (5)$$

For a startup temperature of 0° C. at a pressure of 7 atm. (absolute), the buffer tank capacity would need to be about four gallons. Because it is preferable to minimize the volume of the storage tank in order to minimize crowding in the engine compartment, it is therefore preferable to minimize the buffer tank pressure required for accurate metering of the reformate. It is also preferable to use a cooler between the reformer and the buffer tank, since more reformate can be stored in the tank at lower reformate temperatures. Engine coolant or, preferably, incoming ethanol can be used to cool the stored reformate. As described in the Examples, cold start of a commercial multi-cylinder engine can be achieved using mixtures of E85 and ethanol reformate. Use of 50% reformate/50% E85 greatly reduced CO and hydrocarbon emissions. In some embodiments, the use of mixed liquid fuel and reformate may be preferred in order to reduce the size and pressure rating required for the buffer tank.

A schematic layout of a preferred reformed ethanol flex-fuel power system incorporating an alcohol reformer, reformate cooler, buffer tank and lean $NO_x$ trap is shown in FIG. 1 below. Ethanol is pumped through a heat exchanger where it exchanges heat with reformate exiting the reformer, cooling the reformate and partially vaporizing the incoming ethanol. The ethanol then passes through the reformer and the reformate passes into the reformate buffer tank. The same system configuration can be used without a lean $NO_x$ trap, but this requires that lean engine operation be confined to a smaller portion of the drivecycle.

The pump rate is controlled so as to maintain a pressure setpoint in the reformate buffer tank. This is indicated as a dashed line from the pressure sensor on the buffer tank, P1, and the pump. The temperature is monitored via an internal thermocouple (marked as T). Reformer temperature is controlled using an exhaust diverter valve that controls the fraction of exhaust gas routed through the reformer. The balance of the exhaust gas bypasses the reformer, but both exhaust streams are combined before passing through a lean $NO_x$ trap. Reformate is metered to the engine and to the exhaust for regeneration of the lean $NO_x$ trap as required. A three-way catalyst (TWC) is preferably close-coupled to the exhaust manifold for fast catalyst light-off. A second pressure sensor, P2, monitors pressure downstream of the pump. The pump is shut off when inlet pressure exceeds the pressure rating of the reformer. Also, the pump does not operate unless the reformer is at an acceptable operating temperature, preferably at least about 250° C.

In a preferred embodiment, the buffer tank serves to separate and collect the liquid components of the reformate stream. The liquid is preferably routed to the liquid fuel injectors although it can also be recycled to a fuel tank. Condensation is enhanced if the fuel is further cooled with a heat exchanger located on the reformate path between the reformate cooler and buffer tank shown in FIG. 1. Preferably, the liquid fuel stream is used as a coolant, but a cooling loop using engine coolant can also be used either in place of or as a supplement to the liquid fuel-cooled heat exchanger. After cooling, the liquid must then be separated from the gaseous reformate stream which is directed to the gaseous fuel injectors. This is conveniently accomplished in the buffer tank.

Figure 2:
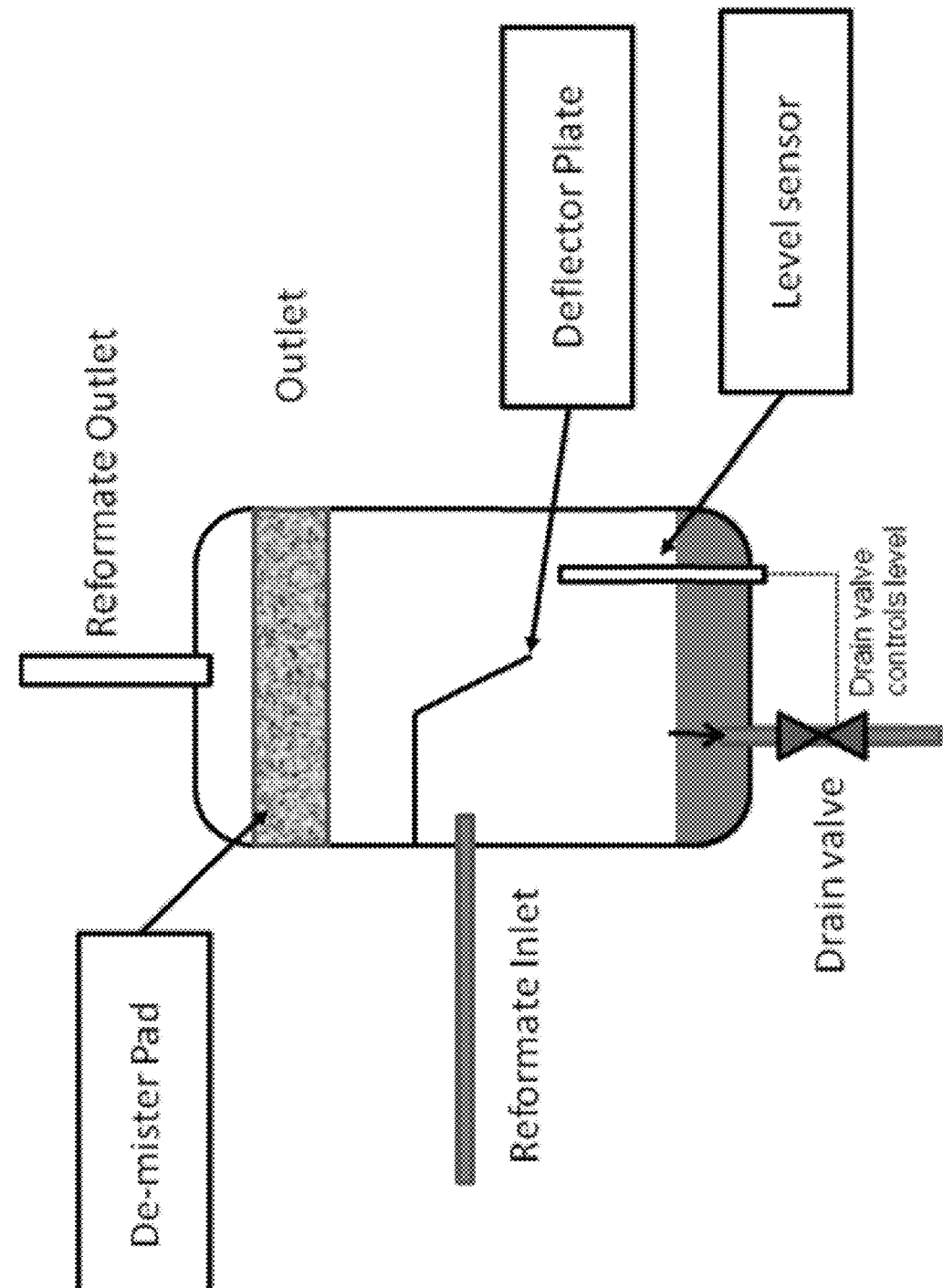
FIG. 2 depicts a buffer tank design with the capability of disengaging liquid droplets in the reformate stream.

Methods for disengaging gas and liquid in this manner are well-known in the art and are described in (M. Stewart and K. Arnold, "Gas-Liquid and Liquid-Liquid Separators," Elsevier, New York, 2008, pp 65-130.) In a preferred embodiment, the reformate stream enters the buffer tank from the side and impinges on a diverter plate. The buffer tank is equipped with a level sensor, preferably utilizing capacitance or conductivity. Liquid level is controlled by draining liquid through a bottom control valve, driven by pressure in the buffer tank. Gaseous reformate exits through the top of the buffer tank. Preferably, a mist extractor, typically made of knitted metal mesh, is located at the top of the buffer tank to knock out liquid droplets. Mist eliminators are described in (Fabian, P.; Cusack, R.; Hennessey, P.; Neuman, M., "Demystifying the Selection of Mist Eliminators," *Chemical Engineering*, November 1993, 100/11, pp. 148-56.) This design is illustrated in FIG. 2.

In the configuration shown in FIG. 1, ethanol reformate is supplied to the intake manifold of the ICE. In another preferred configuration, the reformate can be supplied to port fuel injectors. In either case, however, a set of port fuel injectors (PFI's) is preferably utilized to meter unreformed liquid ethanol or gasoline to the engine. This enables liquid ethanol to be used in conjunction with reformate, making the system robust against fluctuations in reformer activity. Such fluctuations can be caused by, for example, prolonged periods of low exhaust gas temperature due to idling, followed by high power demand.

In a related preferred embodiment, reformate from the buffer tank is supplied upstream, rather than downstream of the catalytic converter. Noble metals in the catalytic converter can oxidize hydrogen and carbon monoxide at lower temperatures than they can oxidize hydrocarbons. As described in U.S. Publication No. US 2009/0071420 A1, addition of hydrogen and carbon monoxide from a reformer to the exhaust gas stream reduces catalyst lightoff temperature to 150-180° C.

Preferably, reformate is introduced into the exhaust stream beginning when catalyst temperature reaches about 100° C. and continuing until catalyst lightoff is achieved. The engine is operated slightly lean during this period, preferably at a lambda ($\lambda$) value which supplies just enough oxygen to the catalytic converter to enable combustion of the hydrogen and CO in the reformate. The rate of reformate supply is largely a function of catalyst activity and can be readily determined empirically for a specific system.

In the United States, ethanol motor fuel is typically supplied as E85, which nominally contains 15% gasoline. Gasoline content can be significantly higher than 15% however. Gasoline does reform at the preferred operating temperatures of the ethanol reformer (less than 350° C.) Therefore, liquid gasoline droplets will be present in the reformate, particularly after cooling. Liquid water may also be present if methanation occurs to a small extent or if hydrous ethanol is used as the fuel. Liquid ethanol may also be present if reforming is incomplete. It has been found that these droplets are a source of "combustion noise." Droplets of condensate in the gaseous fuel stream create variations in the amount of fuel injected. It is therefore preferable to condense the droplets upstream of the reformate fuel injectors.

In a preferred embodiment, the buffer tank serves to separate and collect the liquid components of the reformate stream. The liquid is preferably routed to the liquid fuel injectors although it can also be recycled to a fuel tank. Condensation is enhanced if the fuel is further cooled with a heat exchanger located on the reformate path between the reformate cooler and buffer tank shown in FIG. 1. Preferably, the liquid fuel stream is used as a coolant, but a cooling loop using engine coolant can also be used either in place of or as a supplement to the liquid fuel-cooled heat exchanger. After cooling, the liquid must then be separated from the gaseous reformate stream which is directed to the gaseous fuel injectors. This is conveniently accomplished in the buffer tank.

Methods for disengaging gas and liquid in this manner are well-known in the art and are described in (M. Stewart and K. Arnold, "Gas-Liquid and Liquid-Liquid Separators," Elsevier, New York, 2008, pp 65-130.) In a preferred embodiment, the reformate stream enters the buffer tank from the side and impinges on a diverter plate. The buffer tank is equipped with a level sensor, preferably utilizing capacitance or conductivity. Liquid level is controlled by draining liquid through a bottom control valve, driven by pressure in the buffer tank. Gaseous reformate exits through the top of the buffer tank. Preferably, a mist extractor, typically made of knitted metal mesh, is located at the top of the buffer tank to knock out liquid droplets. Mist eliminators are described in (Fabian, P.; Cusack, R.; Hennessey, P.; Neuman, M., "Demystifying the Selection of Mist Eliminators," *Chemical Engineering*, November 1993, 100/11, pp. 148-56.) This design is illustrated in FIG. 2 below.

Improving disengagement of liquid droplets can also be achieved by employing a waveplate gas-liquid separator upstream of the buffer tank. Waveplate gas-liquid separators are described in (Wilkinson, D., "Optimizing the Design of Waveplates for Gas-liquid Separation," Proc. Instn. Mech. Engrs. vol 213 Part E, 1999, 265-74).

Cost and efficiency advantages can be obtained by optimizing the split between unreformed liquid ethanol and reformate at each operating point of the drivecycle. Example 9 provides data at 2000 rpm, 8.5 bar IMEP from the single-cylinder engine. At such a high power, efficiency using reformate is no better than that using unreformed liquid ethanol. This is because combustion is rapid at high power using liquid ethanol, making the faster combustion kinetics provided by ethanol reformate less important. At the same time, the use of unreformed liquid ethanol cools the fuel-air charge in the cylinder, improving efficiency.

The power at which operation with mixed reformate and liquid ethanol should switch to liquid fuel only depends somewhat on the engine being used. Increasing compression ratio (which increases the temperature of the air-fuel mixture in the cylinder at the end of the compression stroke) and the use of devices to increase charge motion and turbulence in the cylinder enhance dilute capabilities and can enable lean operation using liquid ethanol or E85 with low NOx at 5-7 bar IMEP. Further, including a charge motion control valve for charge motion enhancement as described in Example 13 below may be preferred.

Examples 3-5 show substantial efficiency improvement using dilute combustion of ethanol reformate compared to unreformed liquid ethanol at IMEP values of from about 3.5 to about 6 bar. Thus, for this engine, the use of at least some ethanol reformate is preferred below about 7 bar IMEP. Surprisingly, it has been found that the best efficiency is obtained when from about 25% to about 75% of the fuel (by mass) is reformate with the balance unreformed liquid ethanol. Preferably, the unreformed liquid ethanol is introduced using port fuel injectors.

A preferred embodiment of the strategies described above includes delayed closing of both the exhaust and intake valves at part load. Delayed closure of the exhaust valve provides internal exhaust gas recirculation (EGR) as discussed above, reducing heat losses to coolant and pumping losses. In a particularly preferred embodiment, this delayed valve closing/internal EGR operational strategy is combined with the use of a slightly lean air-fuel ratio, with lambda ($\lambda$) values preferably in the range from about 1.04 to about 1.4 and the use of a lean $NO_x$ trap in the exhaust gas train. The excess air greatly improves EGR tolerance.

In a further preferred embodiment, at part load, the delay in exhaust and intake valve openings are approximately equal, but the magnitude of the delay is adjusted for optimal efficiency. This strategy, referred to as "dual equal cam retard," can be implemented on engines with single overhead cams and variable cam timing.

Implementation of this strategy on a multi-cylinder engine is described below in Example 10. In a further particularly preferred embodiment for engines with a MAP limit, the delay in exhaust and intake valve opening are not equal. Particularly at higher power points where the manifold pressure approaches the MAP limit, it is preferable to limit the delay in exhaust valve opening so as not to exceed the MAP limit and to increase the delay in exhaust valve opening so as to increase internal EGR. This strategy requires "dual independent" control of valve timing which is somewhat more costly than dual equal cam retard, but which provides better NOx and fuel economy at higher load operation points.

As described in the Examples, when operating an engine with dual independent valve timing, selection of the optimal combination of internal EGR and excess air at a specific operating point is based on minimizing NOx and improving efficiency while maintain acceptable COV of combustion and adequate exhaust gas temperatures. The greatest thermal efficiency and the lowest NOx emissions are typically achieved using a combination of internal EGR achieved by delayed valve opening and excess air, rather than the maximum achievable value of lambda. There are several reasons for this. At high cam retard, the late intake valve opening provides higher in-cylinder turbulence which promotes combustion and increases the dilution capability of the engine. For example, at 2.62 bar BMEP and 1500 rpm, a higher amount of dilution is achieved using 55° CA of cam retard and a lambda of 1.35 than by using a lambda of 1.65 with no cam retard. This increases efficiency and decreases NOx emissions. In addition, the delayed valve overlap and late intake valve closing event at 55° CA cam retard provide significantly reduced intake pumping work. Finally, the delayed exhaust valve opening event increases expansion work.

Because of limited availability of ethanol fuel in most areas of the world, the vehicle is preferably equipped with a separate gasoline tank which can also be supplied to the port fuel injectors. If there is insufficient reformate in the buffer tank for cold start, the vehicle can be cold-started using gasoline.

The efficiency of the engine operating on unreformed liquid ethanol and ethanol reformate is improved by the use of increased compression ratios. But gasoline encounters knock problems at high power at compression ratios above about 10. If it is not necessary to retain the ability to operate the engine on both gasoline and ethanol, the compression ratio is preferably increased up to the knock limit of unreformed liquid ethanol. An EPA study reported operation of a spark ignition engine at a compression ratio of 19.5 using liquid ethanol, but it encountered knock at high load and speed. (M. Brusstar et al., SAE 2002-01-2743). In a later study using E85, the compression ratio was reduced to 16.3 (M. Brusstar and C. L Gray Jr., SAE 2007-01-3993).

Increasing the compression ratio generally entails increasing the surface-to-volume ratio in the combustion chamber or cylinder, which tends to quench combustion. Therefore, it is preferable to use a cylinder geometry which minimizes the surface-to-volume ratio. In a preferred embodiment, a bowl-in-piston combustion chamber design is utilized.

In U.S. Publication No. US 2008/0010993 A1, Morgenstern describes a strategy for operating on gasoline at high compression ratio, known as the Atkinson cycle. In this approach, the intake valve is left open after top dead center when operating using gasoline, reducing the effective compression ratio. Example 7 describes operation using gasoline with the Atkinson cycle in a single-cylinder engine using a compression ratio of 14. At lower power (e.g., 3.5 bar IMEP in Example 7), the engine is not knock-limited and the engine can be operated normally on gasoline.

At higher power (e.g., 8.5 bar IMEP, 2000 rpm in Example 7), the engine is severely knock-limited. It has been found that better power is achieved if the Atkinson cycle strategy of delaying intake valve closing is supplemented with delayed spark timing. This is because, even when closing the intake valve at 65 degrees after bottom dead center, the engine was still knock-limited. The effective compression ratio could be further reduced by delaying intake valve closure to an even later crank angle, but this limits the amount of air that can be drawn into the cylinder, reducing peak engine torque. By delaying spark after MBT (maximum brake torque) timing, 8.5 bar IMEP could be achieved. While there is some loss of efficiency from the change in spark timing, efficiency was still better than for gasoline operated on the conventional Otto cycle at a compression ratio of 10, because the Atkinson cycle provided an expansion ratio of 14.

Thus in a preferred embodiment, at compression ratios from about 11 to about 17, and more preferably from about 12.5 to about 15, ethanol reformate is used as the primary fuel for the engine by the means specified above, but provision is also made to fuel the engine with gasoline when desired (preferably via port fuel injectors) and gasoline operation is enabled by delayed closure of the intake valve during the compression stroke (the Atkinson cycle) and the use of spark timing delayed from MBT.

In another preferred embodiment, high octane gasoline is utilized and the compression ratio is limited to about 12. Both fuels can operate well at this compression ratio. Nakata et al. demonstrated that at a compression ratio of 13, both 100 RON gasoline and ethanol provide improved efficiency relative to 92 RON gasoline (SAE 2006-01-3380). In this embodiment, it is not necessary to employ the Atkinson cycle.

Increasing the compression ratio is synergistic with another strategy for improving efficiency and simplifying management of condensate that can be practiced as part of the present invention. Peak engine torque increases with compression ratio. Example 11 shows an increase in peak torque of about 7% accompanying an increase of compression ratio from 10:1 to 12:1. Further increases in the compression ratio result in further increases in torque.

A common strategy for improving engine efficiency is to reduce engine displacement and provide boosting to help restore peak torque. Boosting is typically provided by a turbocharger, but turbocharging is generally not preferred in connection with this invention. Generally, including a turbocharger would reduce exhaust enthalpy which is required by the reformer. Any significant reduction in exhaust enthalpy would might result in unwanted delays in reformer heatup.

However, one skilled in the art could contemplate that the use of a mechanically or electrically-driven supercharger might be of value in conjunction with the present invention because a supercharger is driven either directly by the engine or indirectly via the alternator. Further, the load from a supercharger would be greatly reduced in the present invention when using ethanol fuels at increased compression ratios due to the aforementioned effect of compression ratio on torque.

In embodiments including a supercharger, a turbine-type supercharger is preferred.

Figure 3:
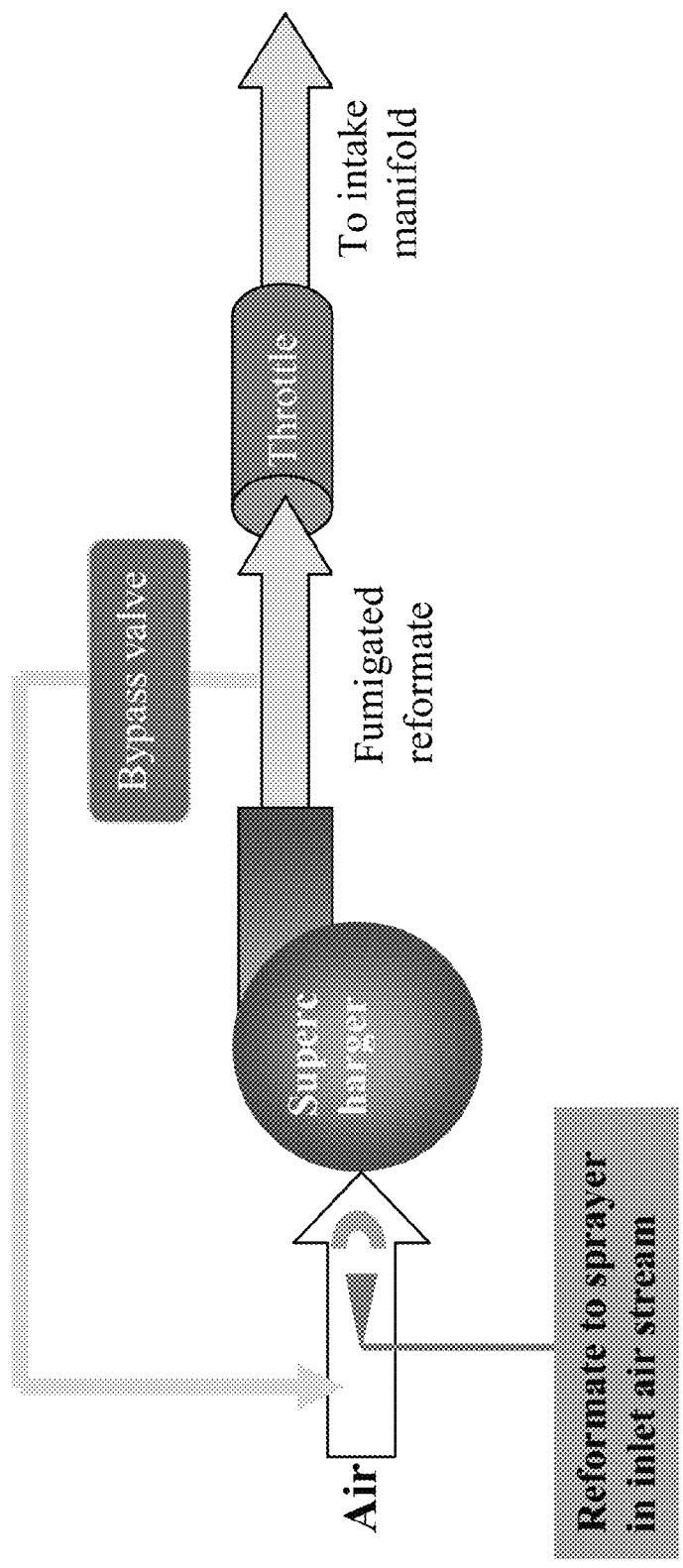
FIG. 3 depicts use of a supercharger with a normally open bypass valve to mix reformate and air where the reformate is sprayed into the air intake of the supercharger.

Supercharging systems generally include bypass valves which, in this case, would be used to recycle the compressed air back upstream of the supercharger. The reformate is introduced just upstream of the supercharger. The reformate-air mixture undergoes multiple passes through the supercharger, particularly when the supercharger was upstream of the throttle valve as shown in FIG. 3 below. Because compression is negligible, the parasitic load of the supercharger should be minor when operating as a mixer.

The reformate is introduced into the intake air upstream of the supercharger using a narrow cone spray device such as a fuel injector. The pressure drop from the buffer tank allows for better atomization of residual liquid as does the push provided by the gaseous reformate. Droplets of condensate are mixed into the stream by the supercharger turbine blades either forming a uniform fog or reversibly wetting the walls of the intake manifold. This prevents combustion noise. Slight differences in the fuel-air ratio reaching different cylinders can be "trimmed" by slight adjustments to the fuel delivered by the liquid injectors.

Efficient condensation upstream of the buffer tank is still essential to this embodiment of the invention because excessive liquid can cause a significant buildup of liquid fuel on the intake manifold surface, leading excessive hydrocarbon emissions during low-power engine transients.

Having described embodiments of the invention in detail, it will be apparent that modifications and variations are possible without departing from the scope of the invention defined in the appended claims.

EXAMPLES

The following non-limiting examples are provided to further illustrate the present invention.

Example 1

This Example provides a description of the single-cylinder piston engine used to demonstrate certain embodiments of the present invention. The engine was equipped with a gas port fuel injection (PFI) system. Engine parameters are given in Table 1.

TABLE 1

Engine parameters

| | |
|---|---|
| Bore [mm] | 90.2 |
| Stroke [mm] | 90.0 |
| Displacement [l] | 0.575 |
| Compression Ratio | 10:1 |
| Valve Arrangement | 2 Intake/1 Exhaust |
| Valve Timing/Lift | Fully Variable |
| Fuel Injection System | PFI |

The engine has two inlet ports, a tangential swirl port and a neutral filling or high flow port. The ports are designed to give a torque meter swirl ratio of 2.6 with only the tangential swirl port valve open and 0.1 with both valves open. Both intake valves were used initially to maximize intake air flow. However, the high flow port was later disabled in order to increase mixing and help prevent bore wash while running E100 (100% unreformed liquid ethanol). The high swirl ratio is also beneficial for operation with high dilution ratios.

A Sturman fully variable hydraulic valve actuation (HVA) system is used on the engine to control valve timings and lifts. It utilizes hydraulic force controlled by high-speed digital latching valves, in place of traditional mechanical camshafts, to actuate engine intake and exhaust valves. Fully variable lift, duration, and timing are independently controlled for all three engine valves. This system does not produce traditional cam valve lift profiles, but rather plateau-like profiles. Fixed valve timing was determined by maximizing intake air flow and peak cylinder pressure while motoring the engine unthrottled at 2000 rpm.

Data using standard gasoline (Indolene) was obtained at a compression ratio of 10:1 using a completely flat piston. All data for ethanol reformate, unreformed liquid ethanol (E100) and blends thereof were obtained at a compression ratio of 14:1 using a domed piston.

The Sturman software controls spark timing and fuel pulse width as well. Intake throttling and fuel pulse width are adjusted to control engine load and air-fuel ratio at each engine speed. Spark timing is controlled in order to maximize torque and avoid detonation.

This engine is also equipped with an EGR valve and cooler. The EGR valve is sized to replace up to 50% of the intake air mass with exhaust gases. The EGR cooler is capable of reducing the exhaust gas temperatures from 1000° C. to 120° C.

For high speed data acquisition, AVL Indimeter 619 was employed. All combustion-related parameters, such as indicated mean effective pressure (IMEP) and crank angle of 50% mass fraction burned location (CA50), were calculated by AVL IndiWin software. All indicated data in the following Examples was calculated as a net value that includes the effects of the intake and exhaust strokes in addition to the compression and expansion strokes (i.e. integrated over 720 crank angle degrees). Volumetric efficiency is calculated using the measured pressure and temperature in the intake manifold. Start of combustion (SOC) is defined as the location at which 5% of the mass fraction is burned. Thermodynamic efficiency is calculated based on the lower heating value (LHV). All other reported parameters are determined using conventional methods.

Most emissions measurements were performed with an AVL CEB II raw emissions bench. The device performs continuous measurement of hydrocarbons (HC), CO, $CO_2$, $O_2$, and $NO_x$. Aldehyde measurements were determined using a handheld device that utilizes colorimetric tubes. The exhaust gas is drawn through the pre-calibrated tubes from a port in the exhaust stream using the hand-held pump. Measurements are recorded in parts per million (ppm) and converted to g/kWh based on total exhaust flow, IMEP and engine speed.

Three fuels were used in these experiments. A standard gasoline, "Indolene," (Conoco Phillips), unreformed denatured ethanol ("The Andersons, Albion Mich., 96.3% ethanol by weight) and simulated ethanol reformate. The simulated reformate comprised a 1:1:1 (mol:mol:mol) mixture of hydrogen, carbon monoxide, and methane with a tolerance of 2% and is representative of the reformate expected to be produced in accordance with the disclosure in the above-mentioned publications of Morgenstern et al.

Both liquid fuels were injected via port fuel injectors. Simulated reformate was injected into the intake system upstream of the EGR valve. It was supplied at a pressure of 3 bar and a temperature of 25° C. The amount of flow is measured in standard liters per minute (SLPM) converted to kg/h, and ultimately reported as a percent of total fuel mass.

Example 2

This Example provides data generated using gasoline in the engine described in Example 1 at a compression ratio of 10:1 using wide-open throttle (WOT). The results are shown in Table 2. In this and subsequent tables, the following abbreviations are used:

NISFC=Net Indicated Specific Fuel Consumption

NITE=Net Indicated Thermal Efficiency

NIMEP=Net Indicated Mean Effective Pressure

COV=Coefficient of Variation of the NIMEP

SA=Spark Advance in Crank Angle Degrees Before Top Dead Center (deg BTDC)

ISCO=Net Indicated Specific CO Emissions

ISHC=Net Indicated Specific Hydrocarbon Emissions

ISNOX=Net Indicated Specific $NO_x$ Emissions

EGT=Exhaust Gas Temperature

In this and all subsequent examples, the emissions values shown are "engine out" and do not reflect the effect of aftertreatment.

TABLE 2

Gasoline (Indolene) at WOT

|  | 1000 rpm | 1500 rpm | 2000 rpm | 3000 rpm | 4000 rpm |
|---|---|---|---|---|---|
| NISFC (g/kWh) | 234 | 233 | 228 | 214 | 224 |
| NITE (%) | 35.6% | 35.7% | 36.5% | 38.9% | 37.2% |
| NIMEP (bar) | 10.7 | 10.7 | 10.5 | 10.8 | 10.2 |
| COV (%) | 1.57% | 1.83% | 3.08% | 1.53% | 2.06% |
| SA (deg BTDC) | 5 | 18 | 22 | 26 | 25 |
| ISCO (g/kWh) | 26.6 | 43.9 | 35.8 | 16.5 | 24.2 |
| ISHC (g/kWh) | 4.63 | 6.81 | 3.06 | 1.90 | 1.09 |
| ISNOX (g/kWh) | 18.16 | 17.84 | 16.00 | 19.71 | 19.74 |
| EGT (° C.) | 584 | 618 | 692 | 781 | 843 |

Example 3

This example presents data at 1500 rpm, 3.5 bar NIMEP for operation of the engine of Example 1 using compression ratio 14 and unreformed liquid ethanol fuel (E100) as well as simulated reformate using either Exhaust Gas Recirculation or high air/fuel ratio. Beginning with this example, another efficiency metric is reported:

Eff. NITE=Effective Net Indicated Thermal Efficiency

This metric sets the fuel value (LHV) of ethanol reformate equal to the fuel value of ethanol. This invention includes the use of exhaust gas heat to drive the conversion of ethanol to ethanol reformate. Because exhaust gas heat is effectively waste heat from the engine, use of exhaust gas heat to drive the reformer does not constitute an efficiency loss. The Eff NITE metric is the efficiency expected for a reformer/engine system of the present invention in converting ethanol to mechanical power if the reformer has no effect on efficiency other than upgrading ethanol to reformate. This parameter excludes effects such as additional exhaust backpressure that might occur in an integrated system, but which are expected to be small.

TABLE 3

Simulated ethanol reformate (Ref) at high air-fuel ratio compared to gasoline and E100 at lambda (λ) = 1 without EGR. 1500 rpm, 3.5 bar NIMEP

|  | Gas λ = 1 | E100 λ = 1 | Ref λ = 1.01 | Ref λ = 1.55 | Ref λ = 1.84 | Ref λ = 2.14 | Ref λ = 2.30 | Ref λ = 2.48 |
|---|---|---|---|---|---|---|---|---|
| NISFC (g/kWh) | 265.0 | 369 | 367.1 | 327.0 | 316.4 | 305.9 | 304.8 | 300.8 |
| NITE (%) | 31.4 | 35.8 | 35.1 | 39.5 | 40.8 | 42.2 | 42.3 | 42.9 |
| Eff NITE (%) | 31.4 | 35.8 | 37.8 | 42.4 | 43.8 | 45.3 | 45.5 | 46.1 |
| COV (%) | 0.9 | 1.0 | 0.8 | 0.7 | 0.6 | 0.8 | 1.4 | 2.4 |
| SA (deg BTDC) | 28 | 14 | 10 | 14 | 18 | 24 | 28 | 42 |
| ISCO (g/kWh) | 18.8 | 9.4 | 11.2 | 7.7 | 11.2 | 15.9 | 22.8 | 27.4 |
| ISHC (g/kWh) | 5.38 | 8.9 | 2.5 | 3.5 | 6.6 | 9.6 | 12.2 | 15.0 |
| ISNOX (g/kWh) | 16.8 | 10.7 | 19.6 | 4.5 | 0.93 | 0.26 | 0.11 | 0.08 |
| EGT (° C.) | 608 | 529 | 525.3 | 437.5 | 394.0 | 354.7 | 334.7 | 312.0 |

TABLE 4

Simulated ethanol reformate (Ref) using cooled exhaust gas recirculation (EGR) compared to gasoline and E100 at lambda (λ) = 1 without EGR. 1500 rpm, 3.5 bar NIMEP

|  | Gas 0% EGR | E100 0% EGR | Ref 0% EGR | Ref 9.7% EGR | Ref 18.0% EGR | Ref 27.5% EGR | Ref 35.9% EGR |
|---|---|---|---|---|---|---|---|
| NISFC (g/kWh) | 265.0 | 369 | 362.0 | 354.1 | 347.3 | 338.4 | 332.8 |
| NITE (%) | 31.4 | 35.8 | 35.6 | 36.4 | 37.2 | 38.1 | 38.8 |
| Eff NITE (%) | 31.4 | 35.8 | 38.3 | 39.1 | 39.9 | 41.0 | 41.6 |
| COV (%) | 0.9 | 1.0 | 0.7 | 0.6 | 0.6 | 0.7 | 1.8 |
| SA (deg BTDC) | 28 | 14 | 10 | 12 | 14 | 18 | 34 |
| ISCO (g/kWh) | 18.8 | 9.4 | 14.6 | 12.6 | 9.4 | 13.1 | 17.4 |
| ISHC (g/kWh) | 5.38 | 8.9 | 2.7 | 3.0 | 4.0 | 5.5 | 9.5 |
| ISNOX (g/kWh) | 16.8 | 10.7 | 18.04 | 10.22 | 4.51 | 1.57 | 0.29 |
| EGT (° C.) | 608 | 529 | 542 | 522 | 508 | 479 | 434 |

Example 4

In this Example, the engine of Example 1 was operated using a mixture of simulated ethanol reformate and unreformed liquid ethanol with cooled exhaust gas recirculation at 3.5 bar NIMEP and several engine speeds. The EGR rate for a given fuel mixture was chosen to maintain a COV of NIMEP less than 2.3%.

The data obtained is shown in the following tables. The data shows that it is not necessary to reform all of the ethanol fuel in order to obtain the emissions and efficiency benefits of ethanol reforming.

TABLE 5

Data for mixed unreformed liquid ethanol (E100) and simulated ethanol reformate (Ref) at a compression ratio of 14:1 compared to gasoline at 10:1 at 1000 rpm, 3.5 bar NIMEP.

| | Gas | 0% Ref 100% E100 | 25% Ref 75% E100 | 50% Ref 50% E100 | 75% Ref 25% E100 | 100% Ref 0% E100 |
|---|---|---|---|---|---|---|
| EGR Rate (%) | 0 | 30 | 30 | 30 | 30 | 30 |
| NISFC (g/kWh) | 274 | 356 | 353 | 346 | 344 | 358 |
| NITE (%) | 30.4 | 37.1 | 36.9 | 37.1 | 36.9 | 35.0 |
| Eff NITE (%) | 30.4 | 37.1 | 37.4 | 38.1 | 38.4 | 36.4 |
| COV (%) | 1.2 | 1.5 | 0.6 | 0.6 | 0.6 | 0.6 |
| SA (deg BTDC) | 18 | 28 | 26 | 24 | 24 | 22 |
| ISCO (g/kWh) | 20.9 | 10.6 | 12.2 | 14.3 | 10.3 | 11.2 |
| ISHC (g/kWh) | 6.5 | 12.54 | 9.5 | 7.5 | 6.6 | 5.4 |
| ISNOX (g/kWh) | 13.79 | 0.85 | 1.11 | 1.31 | 1.00 | 1.08 |
| EGT (° C.) | 521 | 409 | 404 | 406 | 406 | 433 |

TABLE 6

Data for mixed unreformed liquid ethanol (E100) and simulated ethanol reformate (Ref) at a compression ratio of 14:1 compared to gasoline at 10:1 at 1500 rpm, 3.5 bar NIMEP.

| | Gas | 0% Ref 100% E100 | 25% Ref 75% E100 | 50% Ref 50% E100 | 75% Ref 25% E100 | 100% Ref 0% E100 |
|---|---|---|---|---|---|---|
| EGR Rate (%) | 0 | 18 | 18 | 18 | 36 | 36 |
| NISFC (g/kWh) | 265 | 348 | 350 | 349 | 330 | 334 |
| NITE (%) | 31.4 | 38.0 | 37.2 | 36.9 | 38.5 | 37.6 |
| Eff NITE (%) | 31.4 | 38.0 | 37.7 | 37.9 | 40.0 | 39.5 |
| COV (%) | 0.9 | 0.8 | 0.8 | 0.9 | 1.6 | 2.1 |
| SA (deg BTDC) | 28 | 20 | 18 | 16 | 30 | 32 |
| ISCO (g/kWh) | 18.8 | 13.3 | 12.6 | 12.0 | 14.1 | 18.2 |
| ISHC (g/kWh) | 5.4 | 10.1 | 8.1 | 6.1 | 9.6 | 10.0 |
| ISNOX (g/kWh) | 16.78 | 3.14 | 3.47 | 2.85 | 0.21 | 0.23 |
| EGT (° C.) | 608 | 497 | 494 | 505 | 442 | 439 |

TABLE 7

Data for mixed unreformed liquid ethanol (E100) and simulated ethanol reformate (Ref) at a compression ratio of 14:1 compared to gasoline at 10:1 at 2000 rpm, 3.5 bar NIMEP.

| | Gas | 0% Ref 100% E100 | 25% Ref 75% E100 | 50% Ref 50% E100 | 75% Ref 25% E100 | 100% Ref 0% E100 |
|---|---|---|---|---|---|---|
| EGR Rate (%) | 0 | 15 | 30 | 30 | 30 | 30 |
| NISFC (g/kWh) | 261 | 352 | 341 | 337 | 331 | 345 |
| NITE (%) | 31.8 | 37.5 | 38.2 | 38.2 | 38.4 | 36.4 |
| Eff NITE (%) | 31.8 | 37.5 | 38.7 | 39.2 | 39.9 | 38.3 |
| COV (%) | 1.6 | 1.1 | 1.7 | 1.5 | 1.2 | 1.3 |
| SA (deg BTDC) | 32 | 24 | 32 | 30 | 28 | 30 |
| ISCO (g/kWh) | 27.5 | 10.4 | 11.9 | 15.4 | 11.2 | 15.0 |
| ISHC (g/kWh) | 4.6 | 9.3 | 10.8 | 8.87 | 6.8 | 6.7 |
| ISNOX (g/kWh) | 4.09 | 2.77 | 0.39 | 0.51 | 0.53 | 0.71 |
| EGT (° C.) | 660 | 537 | 500 | 490 | 498 | 519 |

Example 5

In this Example, the engine of Example 1 was operated using a mixture of simulated ethanol reformate and unreformed liquid ethanol with cooled exhaust gas recirculation at 6 bar NIMEP at 1500 and 2000 rpm. The EGR rate for a given fuel mixture was chosen to maintain a COV of NIMEP less than 2.3%.

TABLE 8

Data for mixed unreformed liquid ethanol (E100)
and simulated ethanol reformate (Ref) at a compression ratio of
14:1 compared to gasoline at 10:1 at 1500 rpm, 6 bar NIMEP.

|  | Gas | 0% Ref 100% E100 | 25% Ref 75% E100 | 50% Ref 50% E100 | 75% Ref 25% E100 | 100% Ref 0% E100 |
|---|---|---|---|---|---|---|
| EGR Rate (%) | 0 | 18 | 18 | 36 | 36 | 18 |
| NISFC (g/kWh) | 236 | 320 | 318 | 311 | 301.5 | 313 |
| NITE (%) | 35.2 | 41.3 | 40.9 | 41.3 | 42.1 | 40.1 |
| Eff NITE (%) | 35.2 | 41.3 | 41.5 | 42.4 | 43.8 | 42.1 |
| COV (%) | 0.9 | 0.7 | 0.5 | 1.3 | 1.4 | 0.3 |
| SA (deg BTDC) | 24 | 16 | 14 | 30 | 34 | 14 |
| ISCO (g/kWh) | 17.5 | 8.5 | 10.3 | 12.5 | 11.7 | 12.8 |
| ISHC (g/kWh) | 5.4 | 9.1 | 6.9 | 8.9 | 8.3 | 3.6 |
| ISNOX (g/kWh) | 19.00 | 5.16 | 4.98 | 0.26 | 0.26 | 7.02 |
| EGT (° C.) | 620 | 518 | 518 | 433 | 421 | 524 |

TABLE 9

Data for mixed unreformed liquid ethanol (E100)
and simulated ethanol reformate (Ref) at a compression ratio of
14:1 compared to gasoline at 10:1 at 2000 rpm, 6 bar NIMEP.

|  | Gas | 0% Ref 100% E100 | 25% Ref 75% E100 | 50% Ref 50% E100 | 75% Ref 25% E100 | 100% Ref 0% E100 |
|---|---|---|---|---|---|---|
| EGR Rate (%) | 0 | 30 | 18 | 18 | 36 | 36 |
| NISFC (g/kWh) | 229 | 312 | 311 | 312 | 304 | 314 |
| NITE (%) | 36.3 | 42.3 | 42.0 | 41.2 | 41.8 | 39.9 |
| Eff NITE (%) | 36.3 | 42.3 | 42.5 | 42.3 | 43.4 | 42.0 |
| COV (%) | 1.4 | 0.9 | 0.5 | 0.6 | 1.0 | 2.2 |
| SA (deg BTDC) | 28 | 36 | 20 | 18 | 40 | 36 |
| ISCO (g/kWh) | 19.4 | 8.0 | 8.6 | 10.8 | 10.0 | 11.4 |
| ISHC (g/kWh) | 4.1 | 8.8 | 6.3 | 5.5 | 6.7 | 6.7 |
| ISNOX (g/kWh) | 7.02 | 1.12 | 5.28 | 5.43 | 0.49 | 0.55 |
| EGT (° C.) | 672 | 491 | 541 | 544 | 474 | 485 |

Example 6

This Example provides the level of aldehyde emissions (g/kWh as acetaldehyde) for the five speed/load points in Examples 5 and 6 for blends of simulated ethanol reformate and E100. Increasing reformate fraction suppresses aldehydes. Suppression is virtually complete when 100% reformate is used.

TABLE 10

Aldehyde levels (g/kWh) for operation at 3.5 bar
IMEP using several blends of E100 and simulated ethanol
reformate (Ref) and several levels of EGR.

|  | 0% Ref 100% E100 | 25% Ref 75% E100 | 50% Ref 50% E100 | 75% Ref 25% E100 | 100% Ref 0% E100 |
|---|---|---|---|---|---|
| 1000 rpm 0% EGR | 1.71 | 1.00 | 0.77 | 0.40 | 0.03 |
| 1000 rpm 15% EGR | 1.62 | 0.97 | 0.55 | 0.38 | 0.05 |
| 1000 rpm 30% EGR | 1.37 | 1.16 | 0.71 | 0.45 | 0.06 |
| 1500 rpm 0% EGR | 1.99 | 0.99 | 0.71 | 0.69 | — |
| 1500 rpm 18% EGR | 2.14 | 1.32 | 0.87 | 0.63 | — |
| 1500 rpm 36% EGR | 1.90 | 1.49 | 0.94 | 0.80 | — |
| 2000 rpm 0% EGR | 1.49 | 1.08 | 0.91 | 0.48 | 0.09 |
| 2000 rpm 15% EGR | 2.06 | 1.60 | 1.16 | 0.60 | 0.07 |
| 2000 rpm 30% EGR | 1.93 | 1.35 | 1.26 | 0.57 | 0.09 |

TABLE 11

Aldehyde levels (g/kWh) for operation at 6 bar
IMEP using several blends of E100 and simulated
ethanol reformate and several levels of EGR.

|  | 0% Ref 100% E100 | 25% Ref 75% E100 | 50% Ref 50% E100 | 75% Ref 25% E100 | 100% Ref 0% E100 |
|---|---|---|---|---|---|
| 1500 rpm 0% EGR | 1.61 | 1.04 | 0.66 | 0.42 | — |
| 1500 rpm 18% EGR | 1.49 | 1.04 | 0.48 | 0.36 | — |
| 1500 rpm 36% EGR | 1.52 | 1.41 | 0.62 | 0.63 | — |
| 2000 rpm 0% EGR | 1.45 | 0.86 | 1.08 | 0.33 | 0.07 |
| 2000 rpm 18% EGR | 1.59 | 1.01 | 0.70 | 0.31 | 0.05 |
| 2000 rpm 36% EGR | 2.13 | 1.11 | 0.80 | 0.52 | 0.10 |

Example 7

This Example demonstrates the use of gasoline (Indolene) in the engine of Example 1 with a nominal compression ratio of 14:1, using the same piston as in Examples 3-5. Delayed closing of the intake valve and retarded spark were used to prevent engine knock. No EGR was employed.

First, the engine was operated at 1500 rpm, 3.5 bar NIMEP. The engine was not knock-limited at this low load. Therefore, it was not necessary to change the intake valve closing time to provide a lower effective compression ratio. The valve timing was maintained and the spark was varied to determine MBT timing.

As expected, at 2000 rpm, 8.5 bar NIMEP, the engine was extremely knock limited when running gasoline at the higher compression ratio. To mitigate knock, the intake valve closing time was adjusted such that a lower effective compression ratio was achieved. Closing the valve at 65 degrees after bottom dead center provided the highest NIMEP, but the engine was still knock-limited. Knock was eliminated by retarding spark timing.

TABLE 12

Data for gasoline at compression ratios of 10:1 and 14:1 at 1500 rpm, 3.5 bar NIMEP.

|  | 10:1 | 14:1 |
|---|---|---|
| NISFC (g/kWh) | 264 | 263 |
| NITE (%) | 31.5 | 31.6 |
| COV (%) | 1.2 | 0.8 |
| SA (deg BTDC) | 24 | 15 |
| ISCO (g/kWh) | 19.1 | 18.6 |
| ISHC (g/kWh) | 5.2 | 7.3 |
| ISNOX (g/kWh) | 14.6 | 16.3 |
| EGT (° C.) | 615 | 565 |

TABLE 13

Data for gasoline at compression ratios of 10:1 and 14:1 at 2000 rpm, 8.5 bar NIMEP.

|  | 10:1 | 14:1 |
|---|---|---|
| NISFC (g/kWh) | 232 | 221 |
| NITE (%) | 35.9 | 37.3 |
| COV (%) | 3.06 | 0.9 |
| SA (deg BTDC) | 26 | 10 |
| ISCO (g/kWh) | 40.0 | 12.5 |
| ISHC (g/kWh) | 3.7 | 2.8 |
| ISNOX (g/kWh) | 17.1 | 17.2 |
| EGT (° C.) | 682 | 657 |

Example 8

Figure 4:
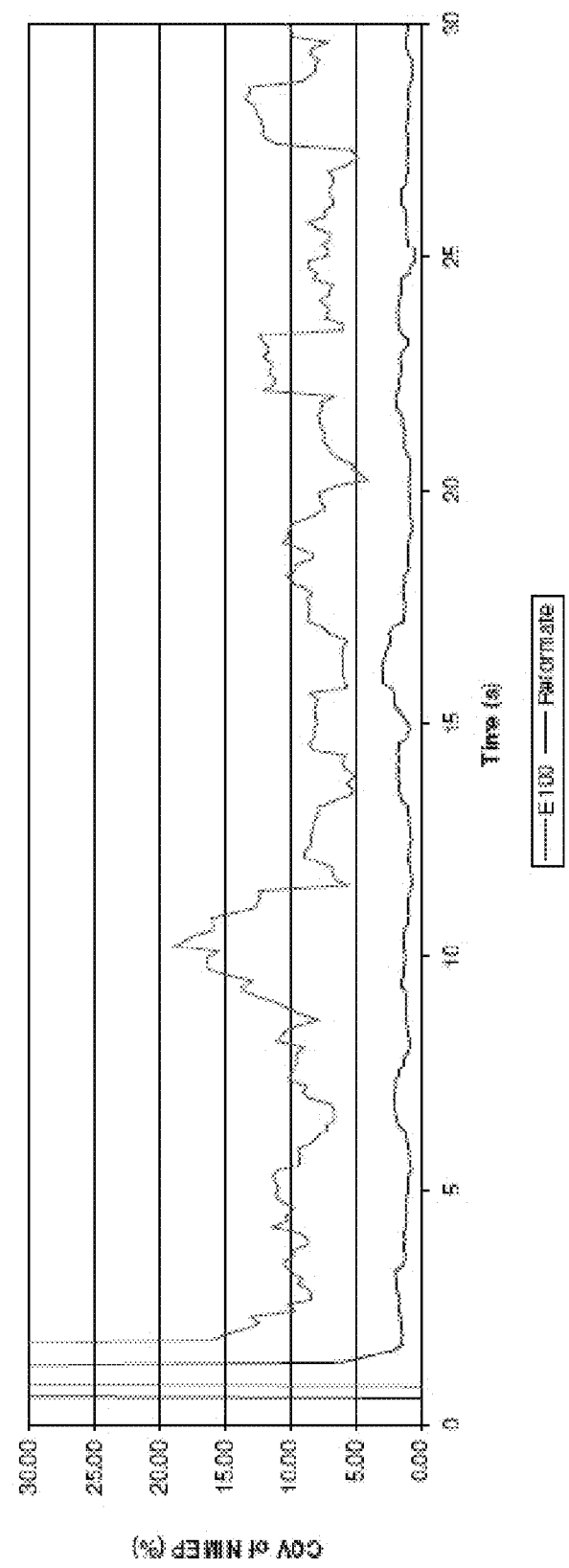
FIG. 4 depicts the coefficient of variation of net indicated mean effective pressure for 25° C. cold start of the engine of Example 1 using reformate and E100 and MBT spark timing as described in Example 8.
Figure 5:
FIG. 5 depicts the hydrocarbon emissions (ppm) during 25° C. cold start of the engine of Example 1 using reformate and E100 at MBT spark timing as described in Example 8.

This Example describes cold starting the engine of Example 1 at indoor ambient temperature (about 25° C.) For the first cold start experiment, 100% reformate was used to start the engine at 1000 rpm, 1.0 bar NIMEP with fluid temperatures set to 25° C. The engine started immediately, with superb combustion stability, indicated by an extremely low COV of NIMEP as shown in FIG. 4. The engine also started immediately when 100% E100 was used. However, combustion stability was poor, indicated by a much higher COV of NIMEP and much higher ISHC emissions (FIG. 5).

Figure 6:
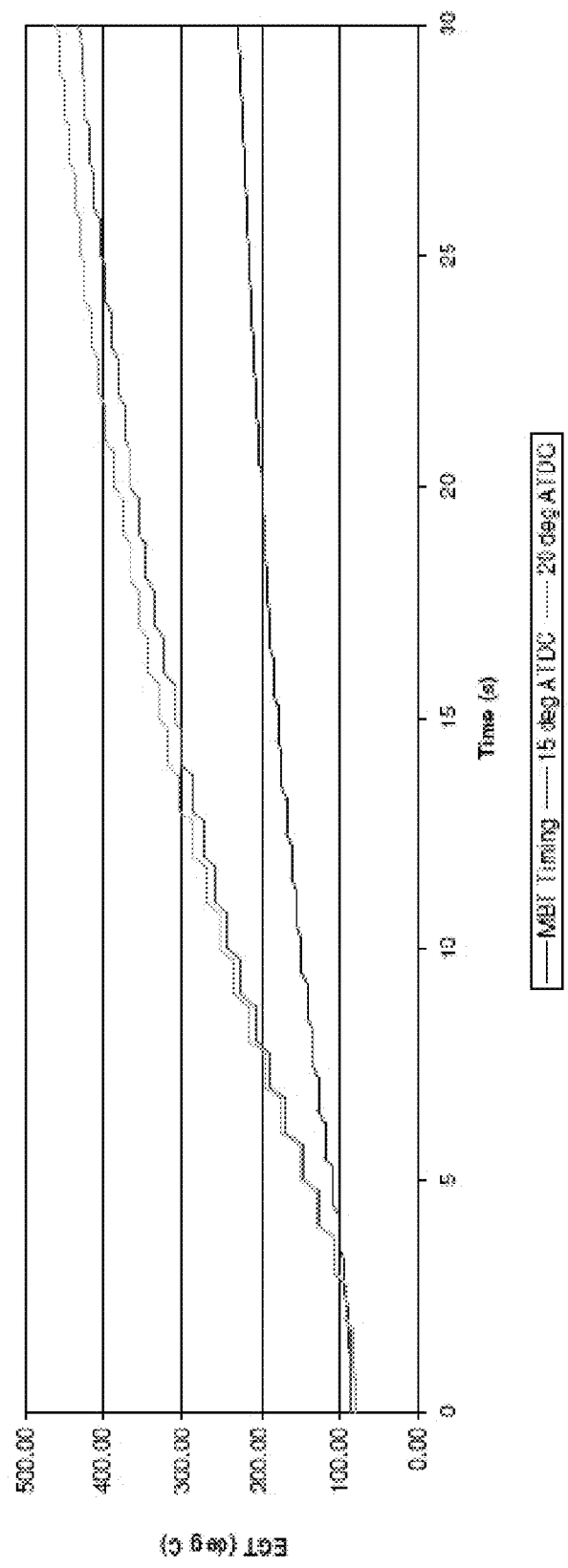
FIG. 6 depicts hydrocarbon emissions (ppm) during 25° C. cold start of the engine of Example 1 using simulated ethanol reformate and E100 at MBT spark timing as described in Example 8.
Figure 7:
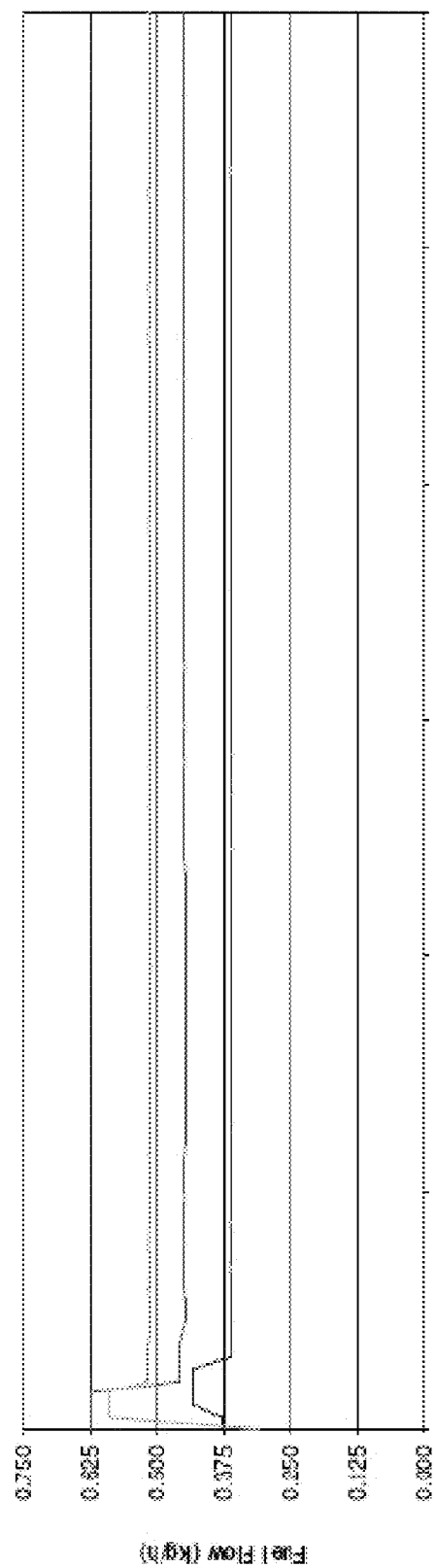
FIG. 7 depicts fuel consumption during cold start of the engine of Example 1 using ethanol reformate at MBT and retarded spark timings as described in Example 8.

In subsequent experiments, spark timing was retarded by 15 and 20 degrees after top dead center in order to raise the temperature of the exhaust gas more rapidly and achieve lightoff of the catalytic converter at an earlier time. The faster rise in exhaust temperatures is shown in FIG. 6. Delaying the spark increased fuel consumption, however, as shown in FIG. 7.

Example 9

In this Example, the engine of Example 1 was operated using a mixture of reformate and liquid ethanol with cooled exhaust gas recirculation at 8.5 bar NIMEP and an engine speed of 2000 rpm. The data is shown in the table below.

For this high load operating point at 2000 rpm, 8.5 bar NIMEP, the amount of reformate flow and the amount of EGR was limited by the amount of total intake mass the engine was capable of flowing at unthrottled conditions. For this reason, only 25% EGR could be achieved in the 100% ethanol case while still maintaining 8.5 Bar NIMEP. For the 75% reformate case, only 15% EGR could be achieved. It is clear that there is no advantage to reforming the fuel at this operating point in terms of thermal efficiency. In fact, the same thermal efficiency and lower ISNOx emissions can be achieved by running 25% EGR with no reformate flow. Reforming does provide lower hydrocarbon emissions at this operating point, however.

TABLE 14

Data for mixed liquid ethanol ("E100") and reformate fuel at a compression ratio of 14:1 compared to gasoline at 10:1 at 2000 rpm, 8.5 bar NIMEP.

|  | Gas | 0% Ref 100% E100 | 25% Ref 75% E100 | 50% Ref 50% E100 | 75% Ref 25% E100 |
|---|---|---|---|---|---|
| EGR Rate (%) | 0 | 25 | 25 | 20 | 15 |
| NISFC (g/kWh) | 232 | 305 | 303 | 304 | 306 |
| NITE (%) | 35.9 | 43.3 | 43.0 | 42.3 | 41.2 |
| Eff NITE (%) | 35.9 | 43.3 | 43.6 | 43.4 | 43.1 |
| COV (%) | 3.1 | 0.92 | 0.69 | 0.63 | 0.48 |
| SA (deg BTDC) | 26 | 26 | 22 | 18 | 16 |
| ISCO (g/kWh) | 40.0 | 11.2 | 8.9 | 6.3 | 8.2 |
| ISHC (g/kWh) | 3.7 | 4.6 | 3.7 | 2.6 | 2.0 |
| ISNOX (g/kWh) | 17.1 | 1.71 | 2.9 | 4.5 | 8.9 |
| EGT (° C.) | 682 | 531 | 536 | 556 | 570 |

Example 10

This Example describes the modification of a Ford 5.4-liter 8-cylinder engine for operation with ethanol reformate and E85 fuel. The engine had three valves per cylinder with dual equal cam retard capability. The compression ratio was increased to 12:1 by increasing the piston height while maintaining a completely flat piston crown.

E85 or gasoline was injected through port fuel injectors. Hydrogen gaseous fuel injectors manufactured by Quantum (P/N 110764-001) were used to introduce reformate fuel just upstream of the liquid fuel in the intake ports. External EGR capability was added using a stainless steel pipe to direct exhaust flow from the engine's right bank exhaust manifold flange to the EGR valve. Engine specifications are given in Table 15.

TABLE 15

Engine specifications for an eight-cylinder engine operated using ethanol reformate and E85 fuel.

| Properties | Value | Unit |
|---|---|---|
| Engine Type | 4-Stroke | — |
| Combustion System | Spark-Ignited | — |
| Charging System | Naturally Aspirated | — |
| Fuel Injection System | Dual Port Fuel Injection | — |
| Valve Configuration | SOHC: 2 Intake - 1 Exhaust | — |
| Engine Configuration | V8 | — |
| Displacement | 5.4 | L |
| Bore | 90.2 | Mm |
| Stroke | 105.8 | Mm |
| Compression Ratio | 9.8:1 | — |
| Conn Rod Length | 169.1 | Mm |
| Piston Pin Offset | 1.0 | Mm |
| Valvetrain | Dual Equal Variable Cam Timing | — |
| Rated Power | 233 | kW |
| Rated Speed | 5000 | Rpm |
| Peak Torque | 515 | Nm |

TABLE 15-continued

Engine specifications for an eight-cylinder engine operated using ethanol reformate and E85 fuel.

| Properties | Value | Unit |
|---|---|---|
| Peak Torque Speed | 3750 | Rpm |
| Fuel | Gasoline/E85 & Reformate | |

Reformers were inserted in the exhaust train downstream of the catalytic converters. A diverter valve placed in the exhaust stream controlled the amount of exhaust flow directed into the reformer. A 5.6 L volume LNT with two 6"×6" aged bricks was installed downstream of the reformer. In the following Examples, data is presented from experiments in which the reformer was not used and reformate was supplied directly from a cylinder containing a 1:1:1 (mol:mol) mixture of hydrogen, methane, and carbon monoxide. This serves to more clearly define the influence of engine operational strategy on efficiency and emissions.

Example 11

Engine torque was measured at wide-open throttle (WOT) for the engine of Example 10 using 98 RON gasoline and certified E85 at compression ratios of 10:1 and 12:1 respectively. The increase in compression ratio and favorable octane ratings of E85 provided a 5-10% increase in maximum torque across a range of engine speeds. The data is shown in Table 16.

TABLE 16

Torque using 98 RON gasoline at CR 10:1 and E85 at CR 12:1. Wide-open throttle.

| | Torque (N-M) | |
|---|---|---|
| Engine speed (rpm) | 98 RON gasoline CR 10 | E85 CR 12 |
| 1000 | 395 | 439 |
| 1500 | 439 | 464 |
| 2000 | 454 | 480 |
| 2500 | 465 | 490 |
| 3000 | 494 | 520 |
| 4000 | 493 | 540 |
| 5000 | 420 | 449 |

Example 12

This Example compares engine efficiency and emissions at three representative steady-state points in the drivecycle. Maximum brake torque (MBT) spark timing was used for all points. The engine operating conditions were optimized separately for 98 RON gasoline, liquid E85, and mixed (50/50) fueling with "simulated reformate" from gas cylinders and liquid E85. The two liquid fuels did not exhibit sufficient dilution tolerance to enable operation with lambda greater than one with acceptable COV and NOx. The optimal points for gasoline and E85 were therefore chosen to correspond to the maximum cam retard achievable while maintaining acceptable COV of combustion. Similarly. The optimum operating point using reformate/E85 was chosen based on efficiency and NOx with acceptable COV of combustion and exhaust temperatures greater than 425° C. As discussed in the specification, this was not typically the point of highest lambda.

Unlike the Examples presenting data from the single-cylinder engine, this data is presented on a "brake" basis with emissions and efficiency referenced to the actual power produced by the engine, not indicated power. For one operating point (1200 rpm, 1.95 bar BMEP), gasoline data is not available due to an experimental problem.

Abbreviations:
COV: Coefficient of variation of IMEP
BSFC: Brake-specific fuel consumption
BTE: Brake thermal efficiency based on the lower heating value (LHV) of the fuel supplied.
Eff BTE: Brake thermal efficiency based on the lower heating value of ethanol for reformate, simulating the effective efficiency of a reformer-engine system.
COV: Coefficient of variation of power per cylinder per cycle
MAP: Manifold absolute pressure
SA: Spark advance before top dead center
BSCO: Brake-specific carbon monoxide emissions from the engine
BSHC: Brake-specific total hydrocarbon emissions from the engine
BSCH4: Brake-specific methane emissions from the engine
BSNOx: Brake-specific NOx emissions from the engine
EGT: Exhaust gas temperature upstream of the catalytic converters, average of two exhaust bank temperatures

TABLE 17

Data from the Engine described in Example 10 using 98 RON gasoline at a compression ratio of 10:1, E85 fuel alone or in a 50-50 mixture simulated ethanol reformate (E85/Ref) at a compression ratio of 12:1 at 1500 rpm, 2.62 bar BMEP. The data shown is at operating points optimized as described in the specification.

| | Gas | E85 | E85/Ref |
|---|---|---|---|
| Lambda | 1.0 | 1.0 | 1.35 |
| Cam Retard (deg CA) | 45 | 50 | 55 |
| BSFC (g/kWh) | 289 | 388 | 364 |
| BTE (%) | 28.8 | 31.7 | 34.0 |
| Eff BTE (%) | | | |
| COV (%) | | | |
| MAP (kPa) | 58.5 | 61.5 | 80.0 |
| SA (deg BTDC) | 47 | 32.7 | 29.6 |
| BSCO (g/kWh) | 17.53 | 14.72 | 4.18 |
| BSHC (g/kWh) | 3.90 | 4.29 | 4.92 |
| BSNOX (g/kWh) | 6.24 | 3.02 | 0.72 |
| EGT (° C.) | 543 | 501 | 465 |

TABLE 18

Data at 1200 rpm, 1.95 bar BMEP

| | E85 | E85/Ref |
|---|---|---|
| Lambda | 1.0 | 1.3 |
| Cam Retard (deg CA) | 15 | 45 |
| BSFC (g/kWh) | 491 | 427 |
| BTE (%) | 25.1 | 29.1 |
| Eff BTE (%) | | |
| COV (%) | | |
| MAP (kPa) | 34.2 | 55.5 |
| SA (deg BTDC) | 25 | 28.8 |
| BSCO (g/kWh) | 27.08 | 5.74 |
| BSHC (g/kWh) | 5.43 | 5.07 |
| BSNOX (g/kWh) | 7.67 | 1.39 |
| EGT (° C.) | 458 | 439 |

Example 13

This Example presents data similar to that in Example 12 at a higher power operating point, 1200 rpm 4.33 bar BMEP. At this point the base cam retard is 50° CA. This provides very high MAP at this operating point which is already close to the limit of 90 kPa. In order to increase lambda, the cam retard must be continually reduced to provide opportunity for increased dilution. The reduced cam retard provides less in-cylinder charge motion which reduces the dilute limit of the engine. This engine was equipped with a 2006MY prototype intake manifold which included a charge motion control valve (CMCV). The CMCV can be used to increase turbulence and promote combustion. It is not used on the 2009MY engine because it is not necessary due to the high levels of cam retard and the increased height of the intake mask in the combustion chamber. However, for this operating point, it was convenient to use the CMCV to promote turbulent mixing to further increase the dilute limit since low levels of cam retard were required. The data in Table 19 reflects the use of the CMCV for E85 and E85/reformate, but not for gasoline.

TABLE 19

Data at 1200 rpm, 4.33 bar BMEP

|  | Gas | E85 | E85/Ref |
|---|---|---|---|
| Lambda | 1 | 1 | 1.6 |
| Cam Retard (deg CA) | 50 | 50 | 35 |
| BSFC (g/kWh) | 256 | 350 | 330 |
| BTE (%) | 32.61 | 35.19 | 37.64 |
| Eff BTE (%) | | | |
| COV (%) | | | |
| MAP (kPa) | 76.5 | 79.7 | 88.4 |
| SA (deg BTDC) | 36 | 21.2 | 24.3 |
| BSCO (g/kWh) | 15.02 | 8.42 | 4.85 |
| BSHC (g/kWh) | 2.90 | 3.60 | 5.85 |
| BSNOX (g/kWh) | 8.50 | 5.09 | 1.71 |
| EGT (° C.) | 524 | 496 | 440 |

Example 14

This Example provides data for the engine of Example 12 at idle. The engine's idle point is unique from the other part-load points discussed. The low EGT at idle prevents the use of high lambda. Also, the low engine oil pressure at idle speed prevents the use of VCT to apply cam retard to increase internal residual. Therefore, the only possible method of increasing dilution is the use of external EGR. This method is typically not used with gasoline or with E85 because it results in degraded idle stability.

The engine was stable at idle for both E85 and the 50% reformate case. However, the reformate case had slightly faster 0-10% burn durations and HC emissions were significantly reduced by the hydrogen promoted combustion. Therefore, the EGR sweep was only performed with reformate since at this low load, increased EGR will increase the HC emissions further. For both cases, lambda was increased slightly to 1.04 to reduce CO emissions to improve fuel consumption, since lean combustion is allowed by the use of the LNT. At idle, small variations in BMEP can cause large changes in combustion stability, fuel consumption and emission measurements if reported in the traditional manner. Therefore, combustion stability is indicated by SD of IMEP and fuel consumption and emissions are reported in grams per hour per liter of engine displacement (g/Lh).

For the reformate case, EGR is increased from 0% to 20% without encountering any stability issues. Increased EGR also provided increased MAP which reduced fuel consumption through reduced pumping work. Feedgas NOx was also reduced significantly due to the higher level of dilution. This is important, because it allows an increased period for running slightly lean before the LNT will require regeneration.

TABLE 20

Data at idle, 525 rpm, 1.0 bar BMEP. Cam retard was zero at idle due to low oil pressure, but external EGR was used.

|  | E85 | E85/Ref |
|---|---|---|
| Lambda | 1.04 | 1.04 |
| EGR % | 2.5 | 20 |
| BSFC (g/kWh) | 640 | 587 |
| BTE (%) | 19.22 | 20.96 |
| Eff BTE (%) | | |
| COV (kPa) | 0.9 | 2.4 |
| MAP (kPa) | 28.3 | 35.6 |
| SA (deg BTDC) | 18.9 | 22.2 |
| BSCO (g/kWh) | 25.79 | 21.38 |
| BSHC (g/kWh) | 27.91 | 14.84 |
| BSNOX (g/kWh) | 5.85 | 0.74 |
| EGT (° C.) | 227 | 253 |

Example 15

This example describes the use and regeneration of a lean NOx trap operating with the engine of Example 12. The engine was operated lean as described in Examples 13 and 14 and then regenerated by operating the engine rich (lambda=0.8) for a few seconds.

Figure 8:
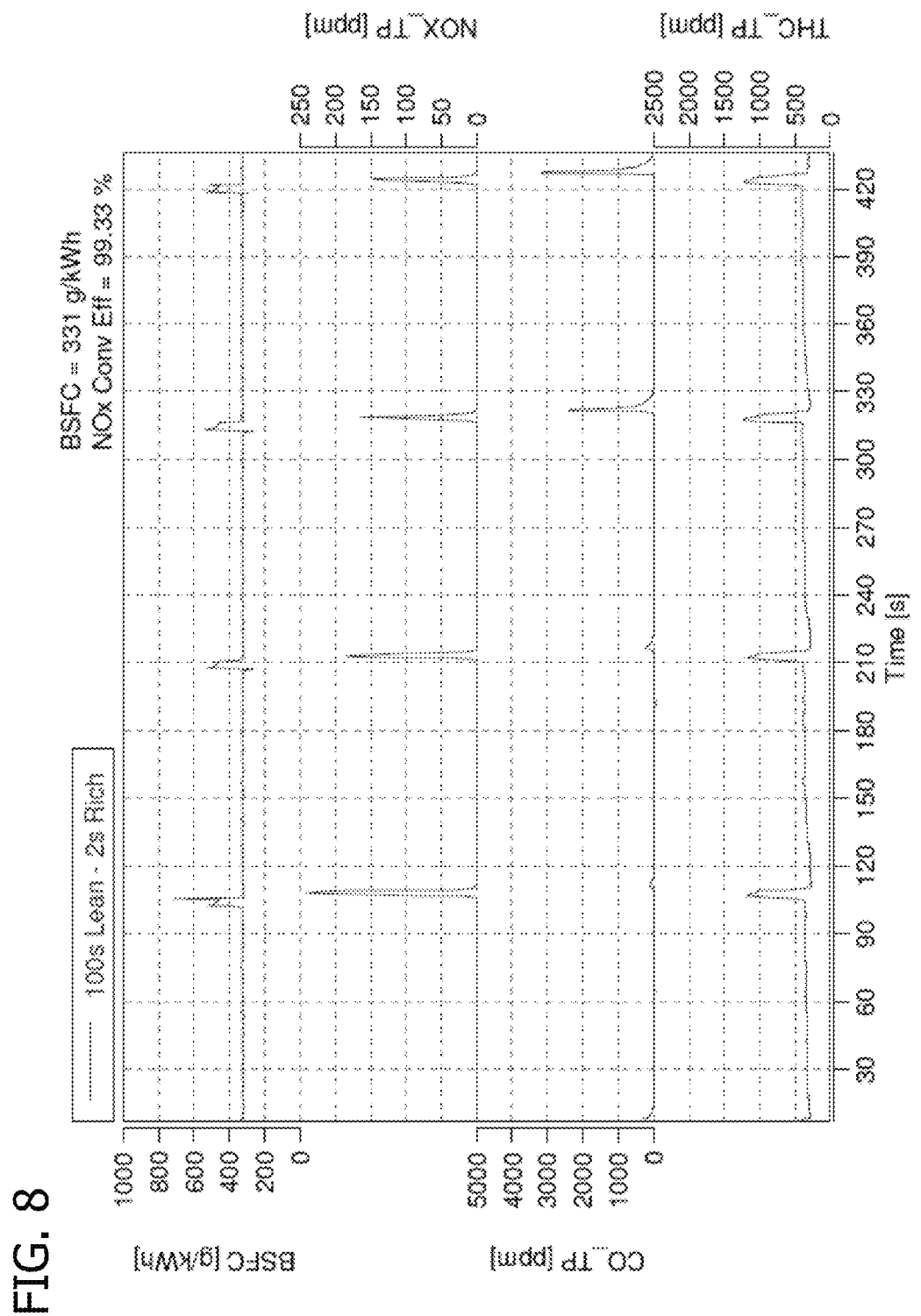
FIG. 8 depicts regeneration cycles while operating the engine at 1200 rpm, 4.33 bar BMEP as described in Example 15.

FIG. 8 shows several regeneration cycles while operating the engine at 1200 rpm, 4.33 bar BMEP as in Example 13. The BSFC achieved with lean operation using reformate at this operating point was 327 g/kWh compared to 347 g/kWh using E85 only and stoichiometric operation. Using the LNT regeneration cycle of 100s lean and 2s rich caused the BSFC to increase by 1.2% to 331 g/kWh. This is a 5% improvement over the baseline E85 case at 12:1 CR and high internal dilution.

The loading capacity of the LNT as well as the conversion efficiency is highly dependent on the LNT catalyst temperature. During this regeneration cycle, the LNT temperature was decreasing slightly. As the temperature stabilized, the conversion efficiency increased. This is indicated by a decreasing tailpipe NOx and an increasing CO slip. The changes in these parameters imply that a longer loading interval or a shorter regeneration interval could be used to optimize this point and further reduce the BSFC.

Figure 9:
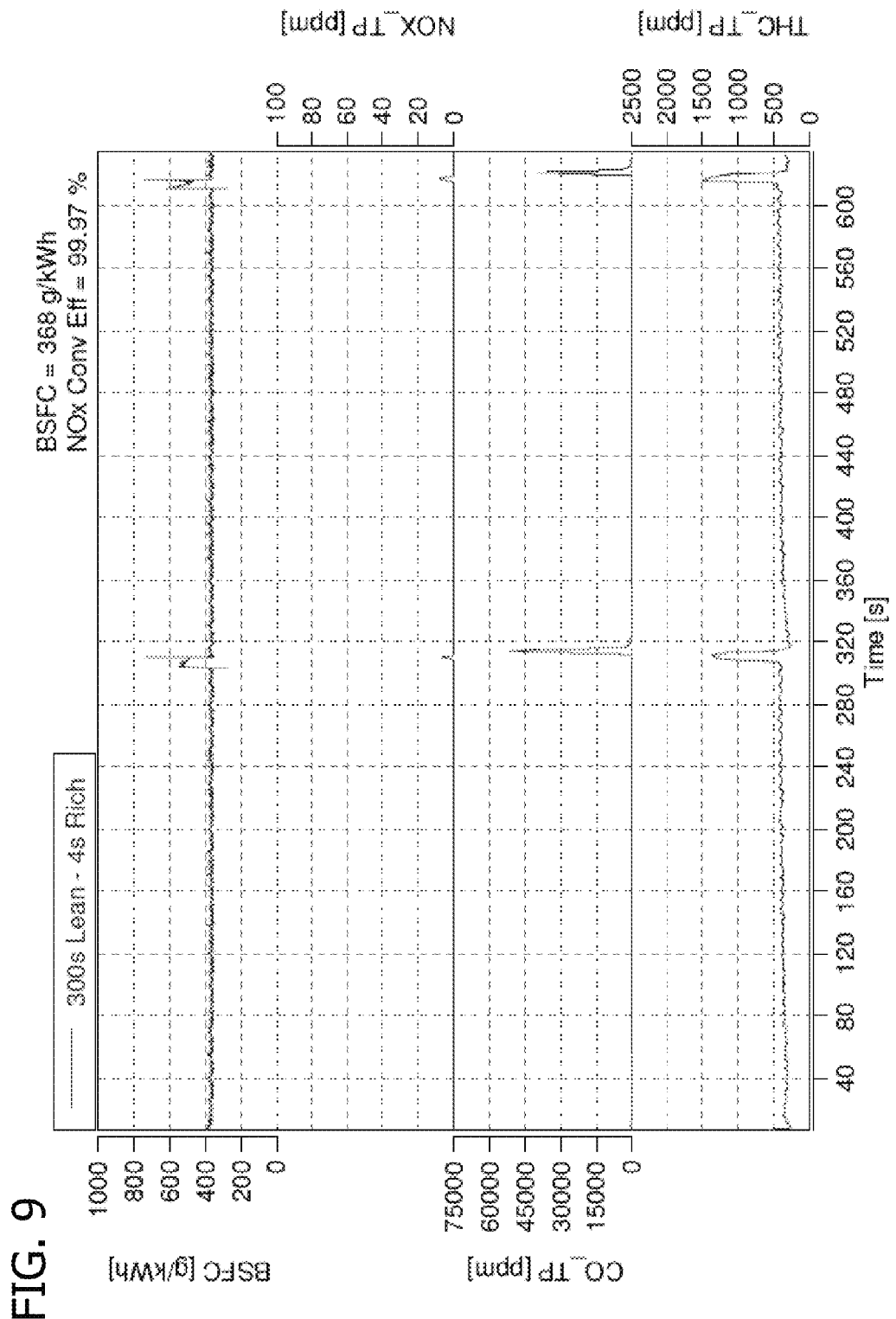
FIG. 9 depicts regeneration of the lean NOx trap at 1500 rpm, 2.83 bar BMEP as described in Example 15.

Regeneration of the lean NOx trap at 1500 rpm, 2.83 bar BMEP is shown in FIG. 9. For this cycle, the intervals were determined to be 300s lean combustion followed by 4s rich combustion. The BSFC achieved with lean operation using reformate at this operating point was 362 g/kWh compared to 377 g/kWh using E85 only and stoichiometric operation. The LNT regeneration cycle of 300s lean and 4s rich increased the BSFC by 1.5% to 368 g/kWh. This interval timing provides extremely high NOx conversion efficiency and very low tailpipe NOx. CO slip and HC slip are very high indicating that further optimization of the interval timing is necessary and would significantly improve BSFC. However, despite the lack of optimization, this timing provides a 2.5% improvement in fuel consumption over the baseline E85 case.

Example 16

This Example describes cold start testing of the engine of Example 12 at 20° C. Cold start on E85 was controlled by the Ford Engine Control Unit (ECU) using the factory calibration. The lambda values for this case are initially as rich as 0.5 in order to fire the engine. Then stoichiometric operation is used while the engine speed is increased and spark timings are retarded to 15° CA ATDC to obtain high EGT for fast light-off of the TWC. Once temperatures of 400° C. are achieved, the engine speed is slowly reduced to approximately 850 rpm. This engine speed is maintained until the engine is warm enough to maintain lower engine idle speed.

Cold start was also achieved with mixtures of E85 and reformate (from a cylinder) at a lambda value of 1.0. Fuel consumption was thereby reduced while the high flammability of the hydrogen leads to extremely fast ignition despite the stoichiometric start-up conditions.

Figure 10:
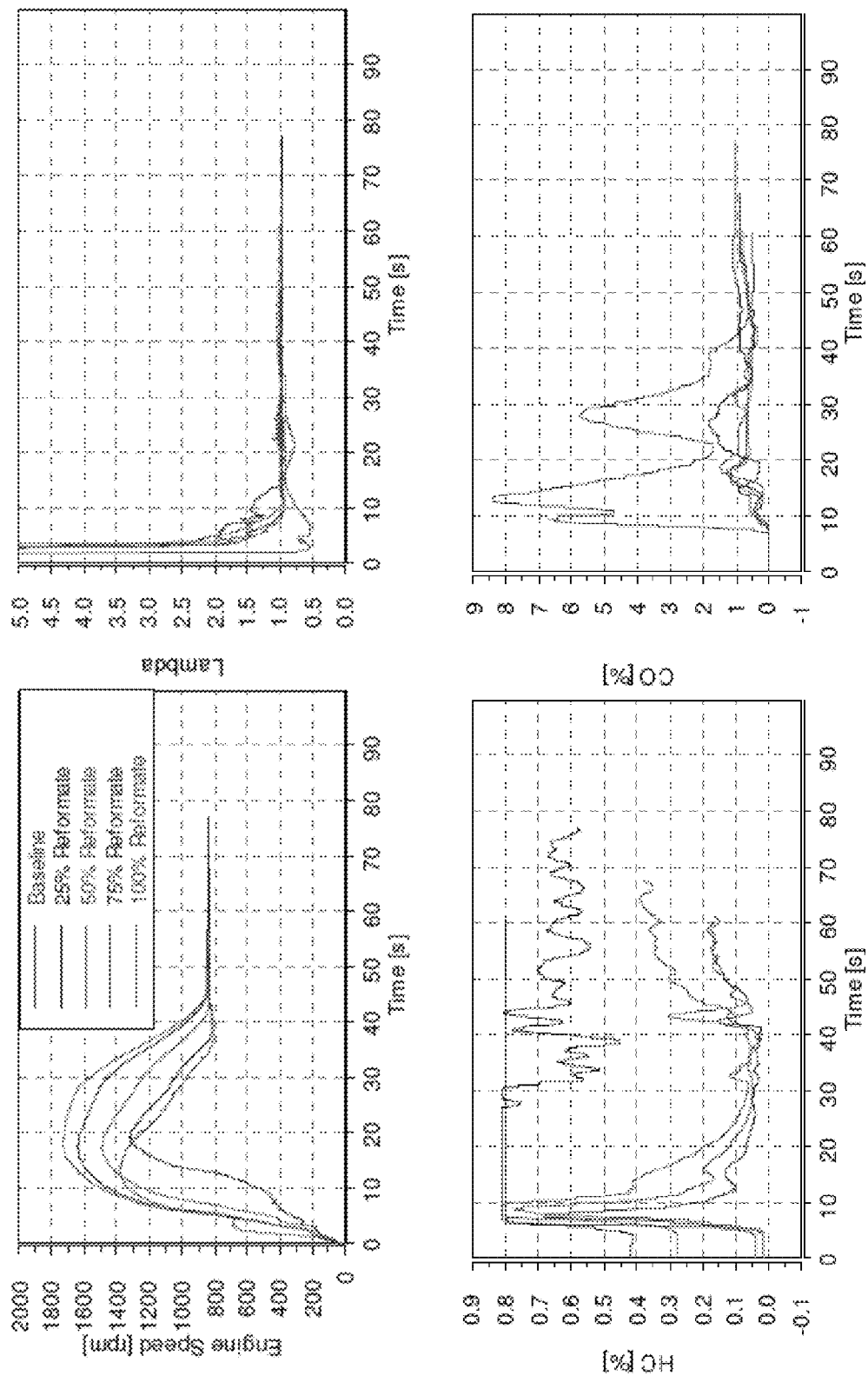
FIG. 10 depicts engine speed, lambda, hydrocarbon, and CO emissions during startup of the engine of Example 12 at 20° C. as described in Example 16.

Importantly, cold start using 50-100% reformate greatly reduced engine-out hydrocarbon and CO emissions, due to the ability to start at lambda=1 and the rapid combustion enabled by hydrogen. As shown in FIG. 10, hydrocarbon emissions using E85 alone exceed the maximum reading of the instrument, but these levels are drastically reduced when using 50%, 75%, or 100% reformate. CO emissions are also dramatically reduced.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A process for producing mechanical or electrical power from a fuel comprising ethanol, the process comprising:
contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof;
combusting a combustible gas mixture in a combustion chamber of an internal combustion engine to produce an exhaust gas mixture, the combustible gas mixture comprising air, hydrogen and methane obtained in the product reformate gas mixture and an exhaust gas effluent comprising from 5% to 40% of the exhaust gas mixture produced in previous combustion;
utilizing the energy of combustion for the generation of mechanical or electrical power;
discharging at least a portion of the exhaust gas mixture from the combustion chamber; and
bringing at least a portion of the discharged exhaust gas mixture into thermal contact with the reforming reaction zone to thereby heat the reforming catalyst therein and cool the discharged exhaust gas mixture.

2. The process of claim 1 wherein the temperature of the reforming catalyst at the exit of the reforming reaction zone is below about 400° C.

3. The process of claim 1, wherein the molar ratio of methane to the carbon oxide component in the product reformate gas mixture is from about 0.9 to about 1.25 and the rate at which methane is produced in the reformate gas mixture is at least about 50% of the rate of ethanol introduced into the reforming reaction zone on a molar basis.

4. The process of claim 1 wherein the combustible gas mixture further comprises unreformed ethanol.

5. The process of claim 1 wherein the combustible gas mixture comprising the exhaust gas effluent is produced by:
internally recirculating a portion of the exhaust gas mixture by retaining a portion of the exhaust gas mixture in the combustion chamber and/or drawing a portion of the discharged exhaust gas mixture back into the combustion chamber during the subsequent intake stroke; and/or
externally recirculating a portion of the cooled exhaust gas mixture into the combustion chamber following thermal contact between the discharged exhaust gas mixture with the reforming reaction zone.

6. A process for producing mechanical or electrical power from a fuel comprising ethanol, the process comprising:
contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof; wherein the molar ratio of methane to the carbon oxide component in the product reformate gas mixture is from 0.9 to 1.25 and the rate at which methane is produced in the reformate gas mixture is at least about 50% of the rate of ethanol introduced into the reforming reaction zone on a molar basis;
combusting a combustible gas mixture comprising air and hydrogen and methane obtained in the product reformate gas mixture in a combustion chamber of an internal combustion engine with from about 5% to about 40% exhaust gas recirculation to produce an exhaust gas mixture;
utilizing the energy of combustion for the generation of mechanical or electrical power; and
bringing at least a portion of discharged exhaust gas mixture into thermal contact with the reforming reaction zone to thereby heat the reforming catalyst therein and cool the discharged exhaust gas mixture.

7. The process of claim 6 wherein the temperature of the reforming catalyst at the exit of the reforming reaction zone is below about 400° C.

8. The process of claim 6 wherein the combustible gas mixture further comprises unreformed ethanol.

9. The process of claim 6 wherein the combustible gas mixture is produced by:
internally recirculating a portion of the exhaust gas mixture by retaining a portion of the exhaust gas mixture in the combustion chamber and/or drawing a portion of the discharged exhaust gas mixture back into the combustion chamber during the subsequent intake stroke; and/or
externally recirculating a portion of the cooled exhaust gas mixture into the combustion chamber following thermal contact between the discharged exhaust gas mixture with the reforming reaction zone.

10. The process of claim 6 wherein the combustible gas mixture comprises at least 20% unreformed ethanol with respect to ethanol reformate in the combustible gas mixture on a mass basis.

11. A process for producing mechanical or electrical power from a fuel comprising ethanol, the process comprising:
contacting a feed gas mixture comprising the ethanol fuel with a reforming catalyst comprising copper in a reforming reaction zone to produce a product reformate gas mixture comprising hydrogen, methane and a carbon oxide component selected from the group consisting of carbon monoxide, carbon dioxide and mixtures thereof;

introducing an intake fluid mixture into a combustion chamber of an internal combustion engine, the intake fluid mixture comprising air and a fuel selected from the group consisting of hydrogen and methane obtained in the product reformate gas mixture, unreformed ethanol and mixtures thereof;

combusting the intake fluid mixture in the combustion chamber to produce an exhaust gas mixture;

utilizing the energy of combustion for the generation of mechanical or electrical power;

discharging at least a portion of the exhaust gas mixture from the combustion chamber; and bringing at least a portion of the discharged exhaust gas mixture into thermal contact with the reforming reaction zone to thereby heat the reforming catalyst therein and cool the discharged exhaust gas mixture, wherein when the internal combustion engine is operated below about 7 bar IMEP, the intake fluid mixture is diluted by at least 20% and the fuel in the intake fluid mixture comprises a mixture of reformed ethanol and unreformed ethanol in a mass ratio of from 1:3 to 3:1.

12. The process of claim 10 wherein the intake fluid mixture is diluted with recirculated exhaust gas mixture and/or air in excess of that required for complete combustion of the fuel.

13. The process of claim 10 wherein when the internal combustion engine is operated from about 5 to about 7 bar IMEP, the fuel in the intake fluid mixture comprises a mixture of reformed ethanol and unreformed ethanol in a mass ratio of from about 1:4 to about 1.5:1.

14. The process of claim 10 wherein when the internal combustion engine is operated above about 8 bar IMEP, the fuel in the intake fluid mixture consists essentially of unreformed ethanol.

* * * * *

UNITED STATES PATENT AND TRADEMARK OFFICE
CERTIFICATE OF CORRECTION

| | | |
|---|---|---|
| PATENT NO. | : 8,967,089 B2 | Page 1 of 1 |
| APPLICATION NO. | : 13/381243 | |
| DATED | : March 3, 2015 | |
| INVENTOR(S) | : David A. Morgenstern et al. | |

It is certified that error appears in the above-identified patent and that said Letters Patent is hereby corrected as shown below:

In the Claims

Column 30, Claim 6, Line 30:
"about 5% to about 40%"

Should read
-- 5% to 40% --

Column 32, Claim 12, Line 5:
"claim 10"

Should read
-- claim 11 --

Column 32, Claim 13, Line 8:
"claim 10"

Should read
-- claim 11 --

Column 32, Claim 14, Line 13:
"claim 10"

Should read
-- claim 11 --

Signed and Sealed this
Sixteenth Day of June, 2015

Michelle K. Lee
*Director of the United States Patent and Trademark Office*